US011839926B2

(12) United States Patent
Dale et al.

(10) Patent No.: US 11,839,926 B2
(45) Date of Patent: Dec. 12, 2023

(54) TRUNNION MOUNTED BLADE GUIDE

(71) Applicant: Norwood Industries Inc., Oro-Medonte (CA)

(72) Inventors: Ashlynne Dale, Oro-Medonte (CA); Sebastien Cabrit, Oro-Medonte (CA)

(73) Assignee: Norwood Industries Inc., Oro-Medonte (CA)

( * ) Notice: Subject to any disclaimer, the term of this patent is extended or adjusted under 35 U.S.C. 154(b) by 0 days.

(21) Appl. No.: 17/514,773

(22) Filed: Oct. 29, 2021

(65) Prior Publication Data

US 2022/0134453 A1 May 5, 2022

(30) Foreign Application Priority Data

Nov. 2, 2020 (CA) ...................................... 3097733

(51) Int. Cl.
*B23D 55/08* (2006.01)
*B27B 13/10* (2006.01)

(52) U.S. Cl.
CPC ............ *B23D 55/082* (2013.01); *B27B 13/10* (2013.01)

(58) Field of Classification Search
CPC ............... Y10T 83/707; Y10T 83/7264; Y10T 83/7195; B26D 1/54; B26D 1/543; B27B 15/02; B27B 15/00; B27B 13/10; B23D 55/082; B23D 55/023; B23D 55/08; B23D 55/00; B23D 55/085; B23D 55/084; B23D 53/006
See application file for complete search history.

(56) References Cited

U.S. PATENT DOCUMENTS

| 1,054,738 | A | * | 3/1913 | Wright | B27B 13/10 83/826 |
| 2,152,906 | A | | 4/1939 | Miller | |
| 2,250,324 | A | * | 7/1941 | Baker | B27B 13/10 411/294 |
| 2,670,767 | A | * | 3/1954 | Miller | B27B 13/10 83/545 |
| 2,688,990 | A | * | 9/1954 | Bushey | B27B 13/10 83/820 |

(Continued)

OTHER PUBLICATIONS

Examiner's Report dated Feb. 2, 2021, for corresponding Canadian Patent Application No. 3,097,733.

(Continued)

*Primary Examiner* — Evan H Macfarlane
*Assistant Examiner* — Fernando A Ayala
(74) *Attorney, Agent, or Firm* — Renner, Otto, Boisselle & Sklar

(57) ABSTRACT

The present invention relates to a blade guide and a blade guide assembly for adjusting an elongate blade of a sawmill, where the blade having a longitudinal axis. The blade guide includes a guide with a blade surface for lateral contact with the blade, a shaft extending from the guide, a shaft block having a bore extending therethrough, the bore dimensioned to slidably receive the shaft therethrough, and a trunnion block pivotably coupled to the shaft block about a pivot. The pivot is orientated generally parallel to the longitudinal axis of the blade, and the trunnion block is adapted to be securable to the sawmill. Thus, pivoting the shaft block and, thereby, the shaft relative to the trunnion block, causes the guide to pivot and angularly adjust the blade about the longitudinal axis.

20 Claims, 42 Drawing Sheets

(56) References Cited

U.S. PATENT DOCUMENTS

| | | | | |
|---|---|---|---|---|
| 8,567,295 B2* | 10/2013 | Wackwitz | ............... | B23D 55/00 |
| | | | | 83/788 |
| 2002/0121171 A1* | 9/2002 | Falberg | ................ | B23D 55/082 |
| | | | | 83/788 |
| 2008/0017000 A1* | 1/2008 | Goto | .................... | B23D 59/001 |
| | | | | 83/168 |
| 2011/0185875 A1 | 8/2011 | Dale | | |
| 2017/0355029 A1* | 12/2017 | Myers | .................... | B23D 55/00 |

OTHER PUBLICATIONS

Notice of Allowance dated May 21, 2021, for corresponding Canadian Patent Application No. 3,097,733.

\* cited by examiner

TRUNNION MOUNTED BLADE GUIDE

This application claims priority of Canadian Application No. 3,097,733, filed Nov. 2, 2020, which is hereby incorporated herein by reference in its entirety.

FIELD OF THE INVENTION

The present invention relates generally to an adjustable blade guide for a band saw such as a band saw on a sawmill utilized for sawing lumber. In particular, the blade guide is configured, among other things, to facilitate angular or lateral adjustment of the blade of the sawmill.

BACKGROUND OF THE INVENTION

Sawmills typically have a large band saw blade, mounted along the path of travel of a log placed on a suitable moving bed with a drive mechanism for advancing the log against the blade. Alternatively, the log remains stationary and the band saw is mounted on a carriage which is capable of transverse displacement along the log.

Ideally, the exposed cutting segment of the blade will run, under tension, through the wood perfectly true, with no deflection on any of the x, y, or z axis. Ideally, it will also run true along the horizontal pitch plane, which is the plane on the flat of the band blade perpendicular to the run of the band blade.

One problem faced with band saws having long band saw blades is the tensioning of said blade. The blade generally moves in a circular path, typically around two band wheels, one of which is powered by a motor, either via direct drive or a belt drive. The segment of the saw blade designated for cutting between the two band wheels is exposed and largely unrestrained. Complex forces on the blade as it passes through the log can result in substantial and undesired motion of the blade, resulting in reduction in efficiency, reduction in accuracy and quality of the cut, and an increase in wear on the saw blade and sometimes its drive assembly and motor.

One way in which to counteract such forces is through adjusting bandwheel alignment. There is a certain amount of adjustability of the blade level by adjusting bandwheel alignment. However, given that the radius of the bandwheels tend to be quite large, and the distance between the point of contact between the apex of the bandwheel and the blade to the wood is quite large, the alignment of the band saw blade is not easily refined in that manner. Moreover, the bandwheels provide little support to assist the blade in resisting deflection on the vertical axis, and resisting rearward pressure.

To counteract such forces one can provide one or more blade guides to guide the blade. Blade guides provide blade support closer to the wood cut. Firstly, blade guides can be closer to the blade than the bandwheels. They provide support for the blade against deflection as it is subjected to the forces during cutting. The use of blade guides also provides more refined blade alignment adjustability.

Typically, a blade guide will be rigidly affixed to the band saw, and extend into, or immediately proximate to, the path of the blade. A blade guide will often have an upper and a lower jaw and rear thrust plate, each having roller wheels or other low friction running surface, or alternatively, one-sided support surface and rear thrust plate. The flat portion of the blade, or in the alternative, the straight edge of the blade, will travel along the roller wheels. The blade guide helps prevent transverse motion while minimally affecting the desired rotatory blade motion.

However, preventing transverse motion of the blade does not allow for other adjustment to the blade. If the band blade enters the wood with an angle on the pitch plane, for example, the blade is prone to diving or rising during the cut, which tends to yield wavy boards.

Some sawmills have been designed to add angular adjustability to the blade guides to refine the level of the blade on the pitch plane as it enters the wood. For example, shims or washers may be added at the connection where the saw head and blade guide bracket come together, or partway down the blade guide bracket assembly. Alternately, the depth of threaded fasteners may be modified.

A drawback to those types of systems, however, is that they are crude and awkward. Traditional blade guides prevent deflection up and down along the x and y axis, and rearward deflection on two axes. Typically the guides can be adjusted to support the blade on those two axes. However, they are difficult to adjust. They also are not very effective in adjusting the pitch plane, if they allow for pitch plane adjustment at all. A further drawback is that the adjustment is made at a distance from the plane that is to be adjusted (i.e. the pitch plane of the blade). The longer the fulcrum, the more difficult it is to make and maintain small and refined adjustments.

Thus, there is a need for an improved mill having an adjustable blade guide that is easy to adjust and that permits effective alignment of the blade on all 3 axes, as well as along the pitch plane about the longitudinal axis.

SUMMARY OF THE INVENTION

The present invention provides a blade guide for adjusting an elongate blade of a sawmill, the blade having a longitudinal axis, the blade guide comprising: a guide with a blade surface for lateral contact with the blade; a shaft extending from the guide; a shaft block having a bore extending therethrough, the bore dimensioned to slidably receive the shaft therethrough; and a trunnion block pivotably coupled to the shaft block about a pivot, the pivot orientated generally parallel to the longitudinal axis of the blade, the trunnion block adapted to be securable to the sawmill; wherein pivoting the shaft block and, thereby, the shaft relative to the trunnion block causes the guide to pivot for adjusting the blade about the longitudinal axis.

The invention also teaches an alternate blade guide wherein the trunnion block further comprises a projection extending from the header away from the extensions, the block opening extending through the projection of the trunnion block.

There is also provided a blade guide assembly for adjusting an elongate blade of a sawmill, the blade having a longitudinal axis, the blade guide assembly comprising: the blade guide described above, a sawmill member to which the trunnion block is secured; and a vertical adjustment mechanism positioned between the sawmill member and the trunnion block, the vertical adjustment mechanism configured to modify the vertical position of the trunnion block relative to the sawmill member.

DETAILED DESCRIPTION OF THE PREFERRED EMBODIMENTS

The present invention provides a simple and effective adjustable blade guide mechanism for a band saw. In use, blade guides help to prevent undesired transverse and/or vertical movement of the saw blade during cutting.

Figure 1:
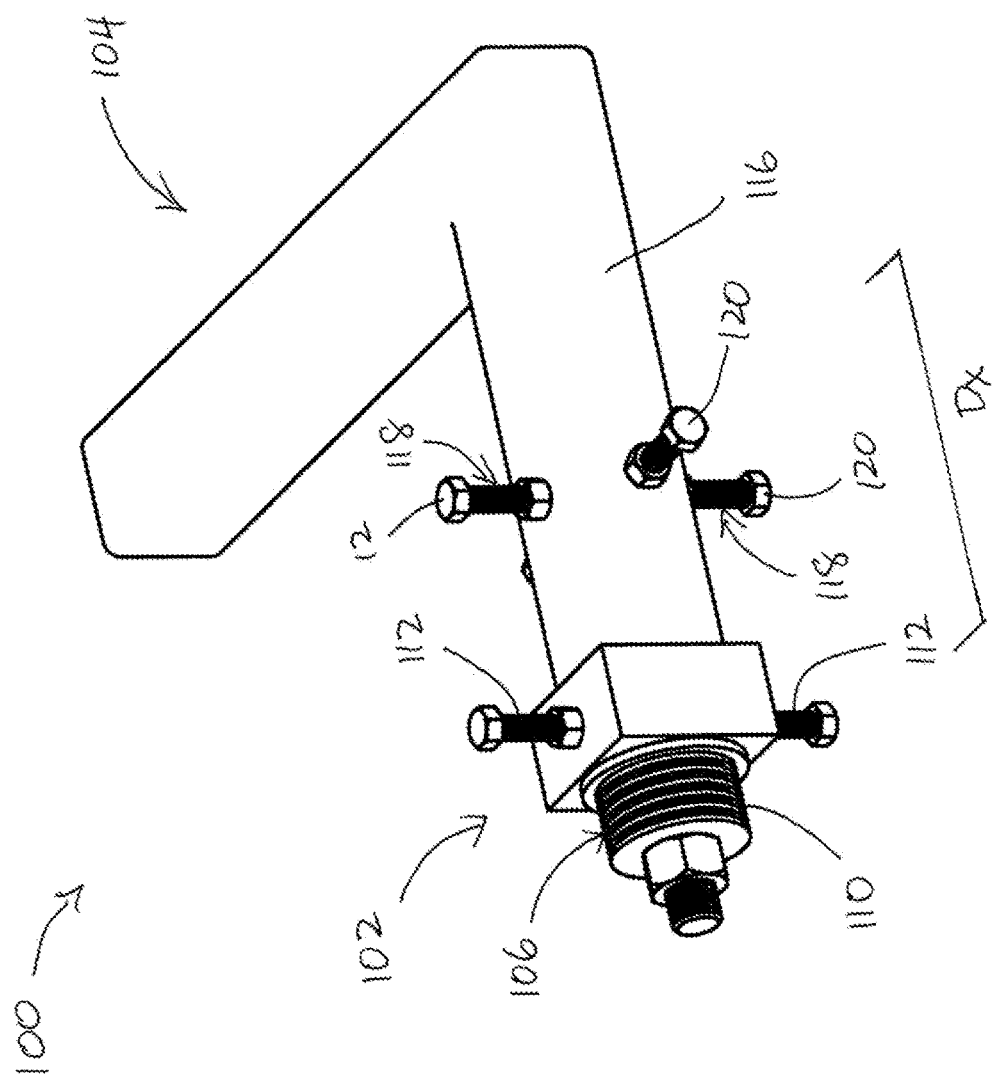
FIG. 1 is an upper perspective view of a conventional blade guide assembly of the prior art.
Figure 2:
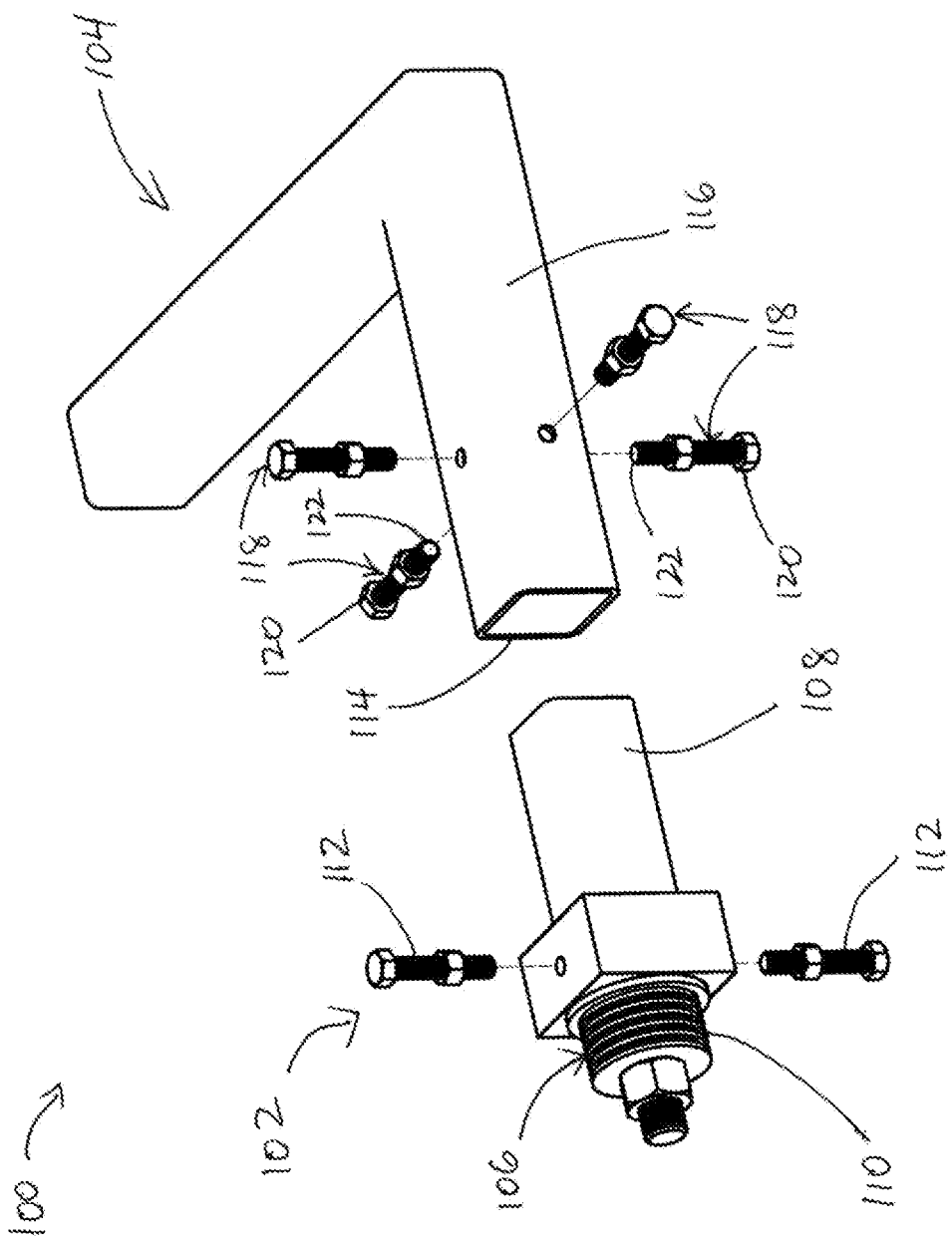
FIG. 2 is an exploded view of the blade guide assembly of FIG. 1.

An existing or conventional blade guide 102 in a conventional blade guide assembly 100 further allows for angular lateral or traverse adjustment/rotation of the blade about its longitudinal axis. An example of this is Cook's MP-32 sawmill (http://cookssaw.com/mp-32-sawmill/), as shown in FIGS. 1 and 2.

Conventional blade guide assembly 100 includes conventional blade guide 102 and a blade guide bracket 104. Conventional blade guide 102 is releasably secured to blade guide bracket 104, which in turn is secured to a sawmill (not shown).

As illustrated in the depicted embodiment, conventional blade guide 102 comprises a conventional roller guide 106 from which a square shaft 108 extends. Conventional roller guide 106 has a contact surface 110 which laterally or transversely contacts and guides an elongate blade (not shown) of the sawmill.

Conventional blade guide 102 further includes two height adjustment bolts 112, extending vertically into conventional blade guide 102. Height adjustment bolts 112 may be turned to shift conventional roller guide 106 vertically relative to the sawmill. Square shaft 108 has a square tubular shape, and is dimensioned to slidably fit within a receiving end 114 of blade guide bracket 104.

Blade guide bracket 104 is shown to have a receiving portion 116 extending from receiving end 114 that has a correspondingly square tubular shape. Receiving portion 116 and receiving end 114 are also dimensioned to receive square shaft 108 therein. In particular, square shaft 108 is dimensioned to be smaller than receiving portion 116 such that square shaft 108 is not flush, or does not directly abut, the interior walls of receiving portion 116. In other words, receiving portion 116 is dimensioned so as to allow square shaft 108 a degree of angular movement within receiving portion 116.

Blade guide bracket 104 further includes four angle adjustment bolts 118, one extending into blade guide bracket 104 from each of the four sides, spaced apart from receiving end 114. Each angle adjustment bolt 118 has a head 120 and an opposed end 122, which extends into blade guide bracket 104 so that each opposed end 122 contacts and pushes on/operatively engages with square shaft 108.

In order to angularly adjust roller guide 106, such that contact surface 110 laterally adjusts the blade of the sawmill (i.e. adjusts the blade about the longitudinal axis of the blade), the top and/or bottom angle adjustment bolts 118 are turned so their respective opposed end 122 pushes square shaft 108 up or down within receiving portion 116. This rotates conventional blade guide 102 about receiving end 114, which acts as a pivot point. Thus, for example, when the top angle adjustment bolt 118 is rotated to push square shaft 108 down within receiving portion 116, roller guide 106 and contact surface 110 rotate upward. The rotation of contact surface 110 allows the outer edge of the blade to rotate upwards and/or the inner edge of the blade to rotate downwards about the longitudinal axis of the blade. Such modification is referred to herein as angular lateral adjustment of the blade.

As noted above, however, a drawback of conventional blade guide assembly 100, and other similar adjustment assemblies, is that the adjustment is made (by angle adjustment bolts 118) at a distance from the plane that is to be adjusted (the plane of the blade), indicated as Dx. The longer the distance between the point of adjustment and fulcrum or pivot point, the more difficult it is to make small and refined adjustments. Other drawbacks include the need for multiple (up to 6) adjustment points, each of which can suffer from unwanted loosening during operation.

FIGS. 3-8 illustrate a band saw or sawmill 70 with a band saw head 71 in which two embodiments of a blade guide according to the present invention are incorporated. One embodiment is shown as a fixed blade guide 10, and the other embodiment shown as a slideable blade guide 11.

Figure 3:
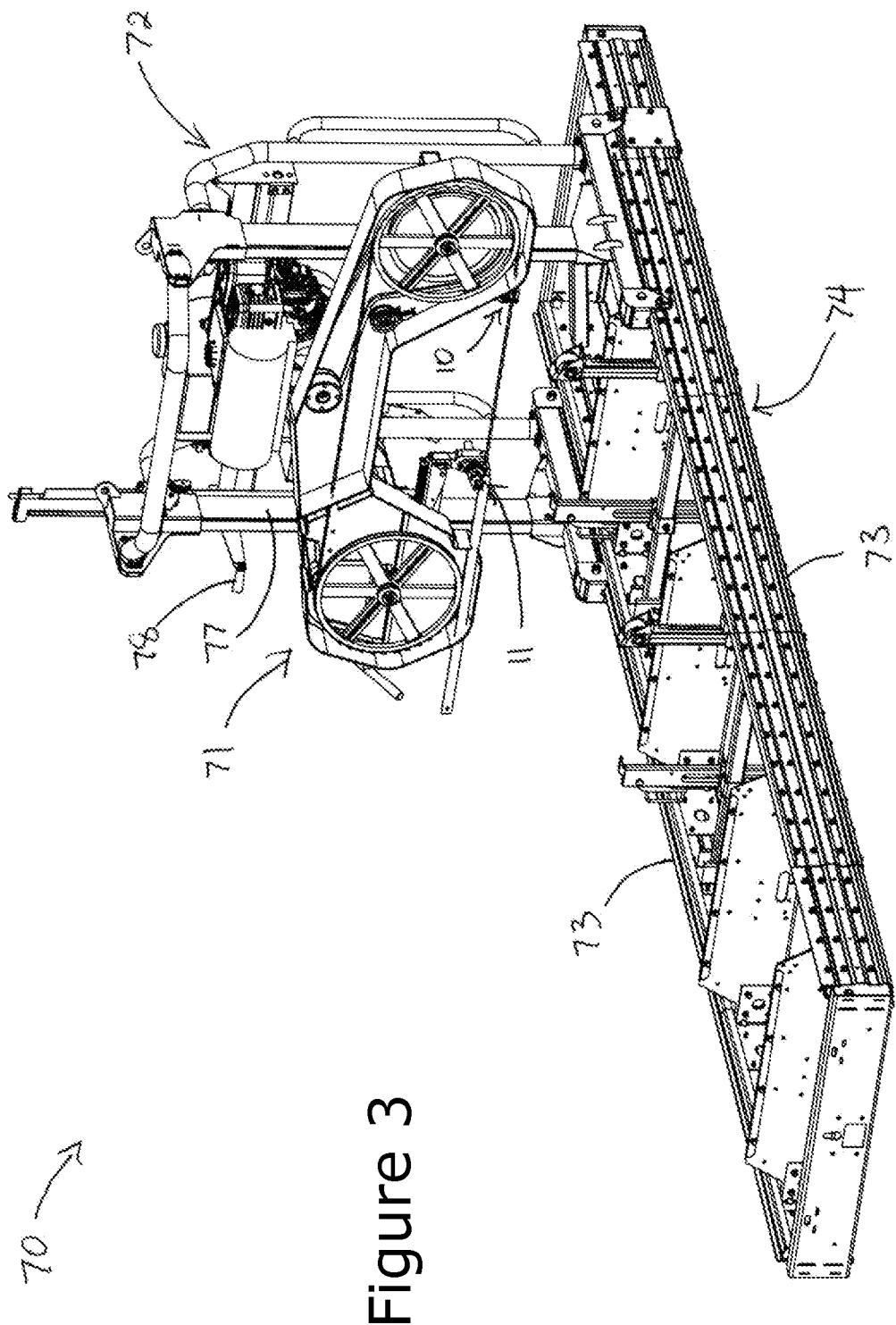
FIG. 3 is an upper perspective view of an embodiment of a fixed blade guide and an embodiment of an slidable blade guide according to the present invention incorporated into a band saw head of a sawmill.
Figure 4:
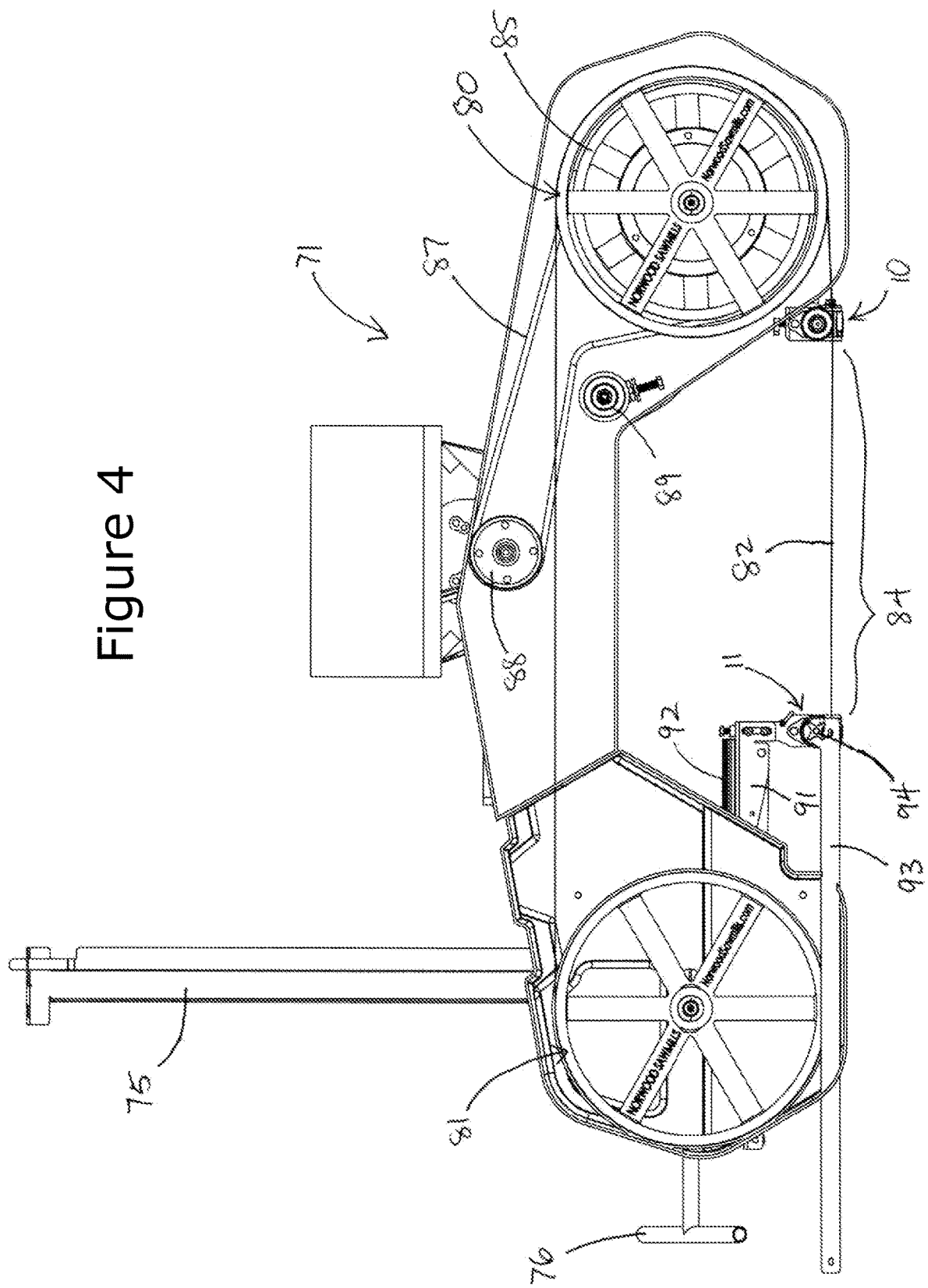
FIG. 4 is a front elevational view of the band saw head of FIG. 3 in isolation.
Figure 5:
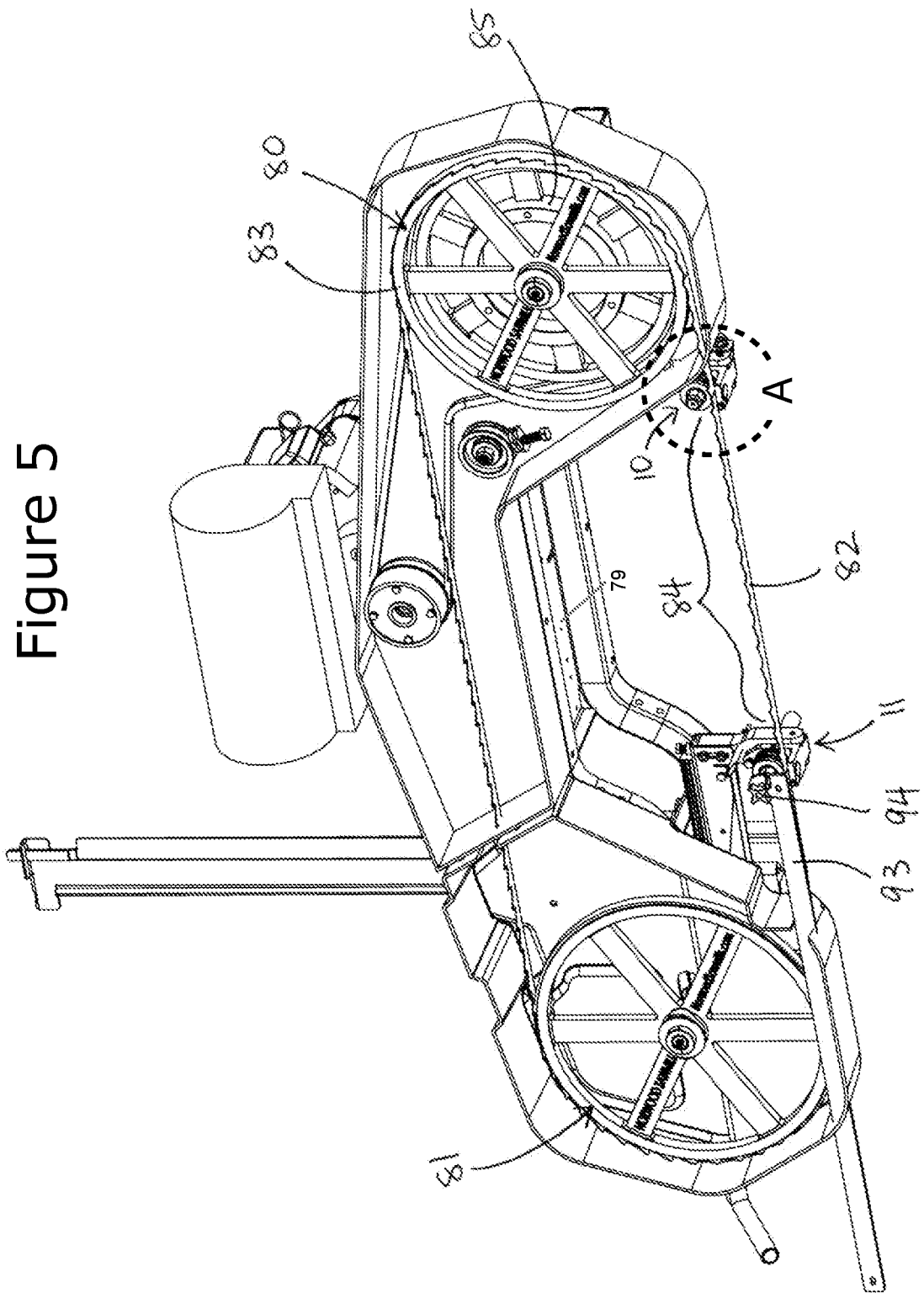
FIG. 5 is a front lower perspective view of the band saw head of FIG. 4.
Figure 6:
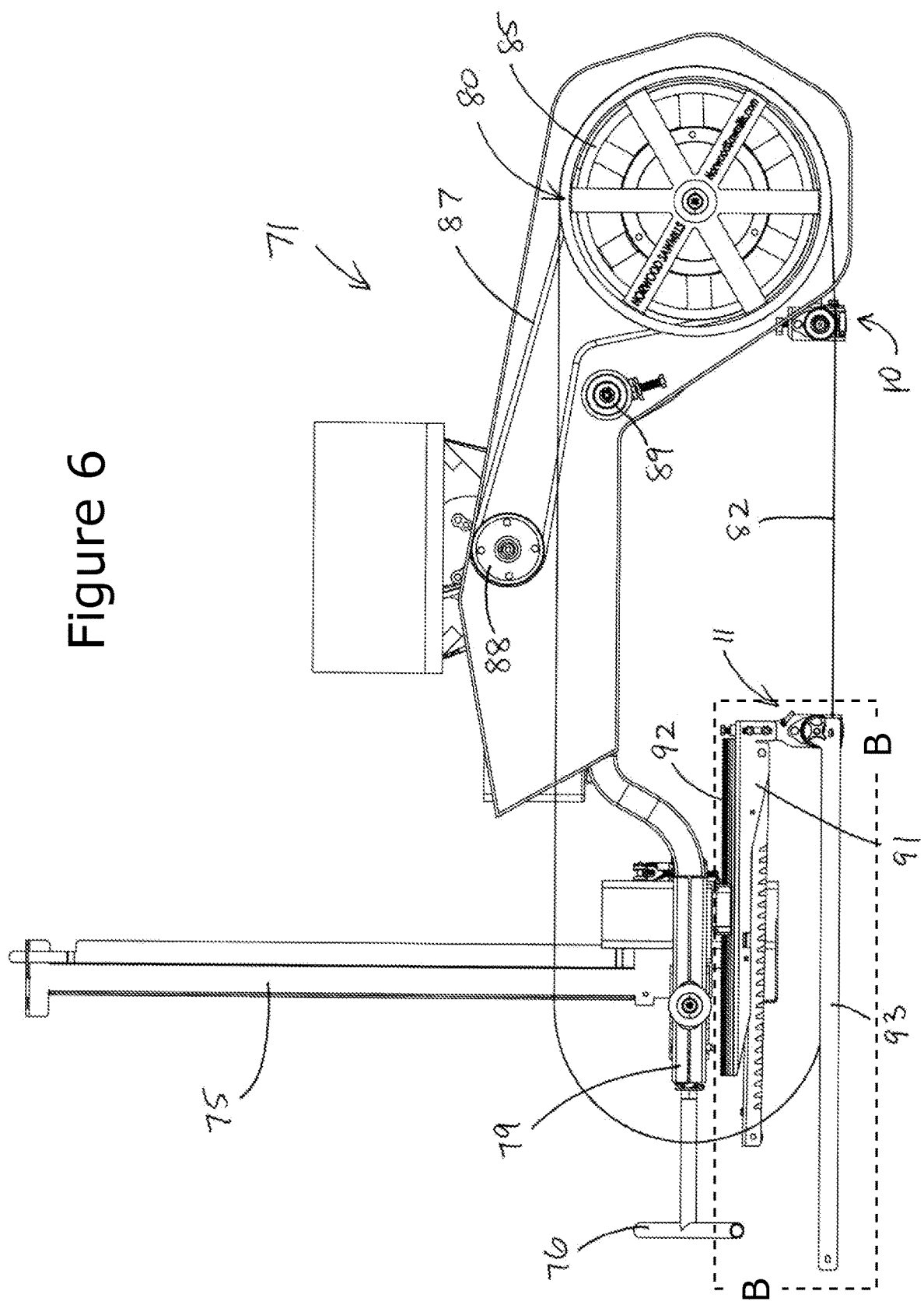
FIG. 6 is a front elevational view of the band saw head of FIG. 4 with the free wheel removed.
Figure 7:
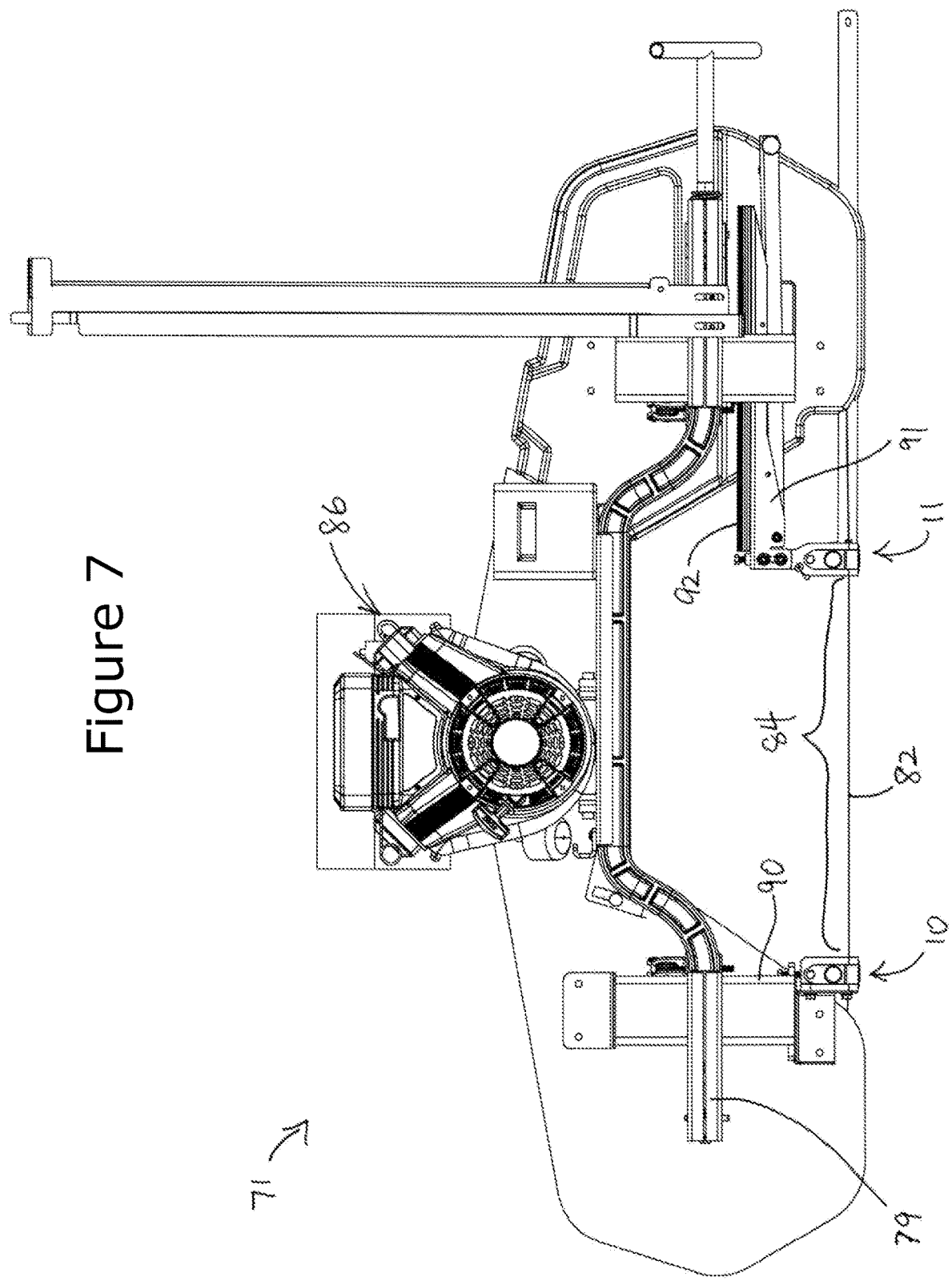
FIG. 7 is a rear elevational view of the band saw head of FIG. 4.
Figure 8:
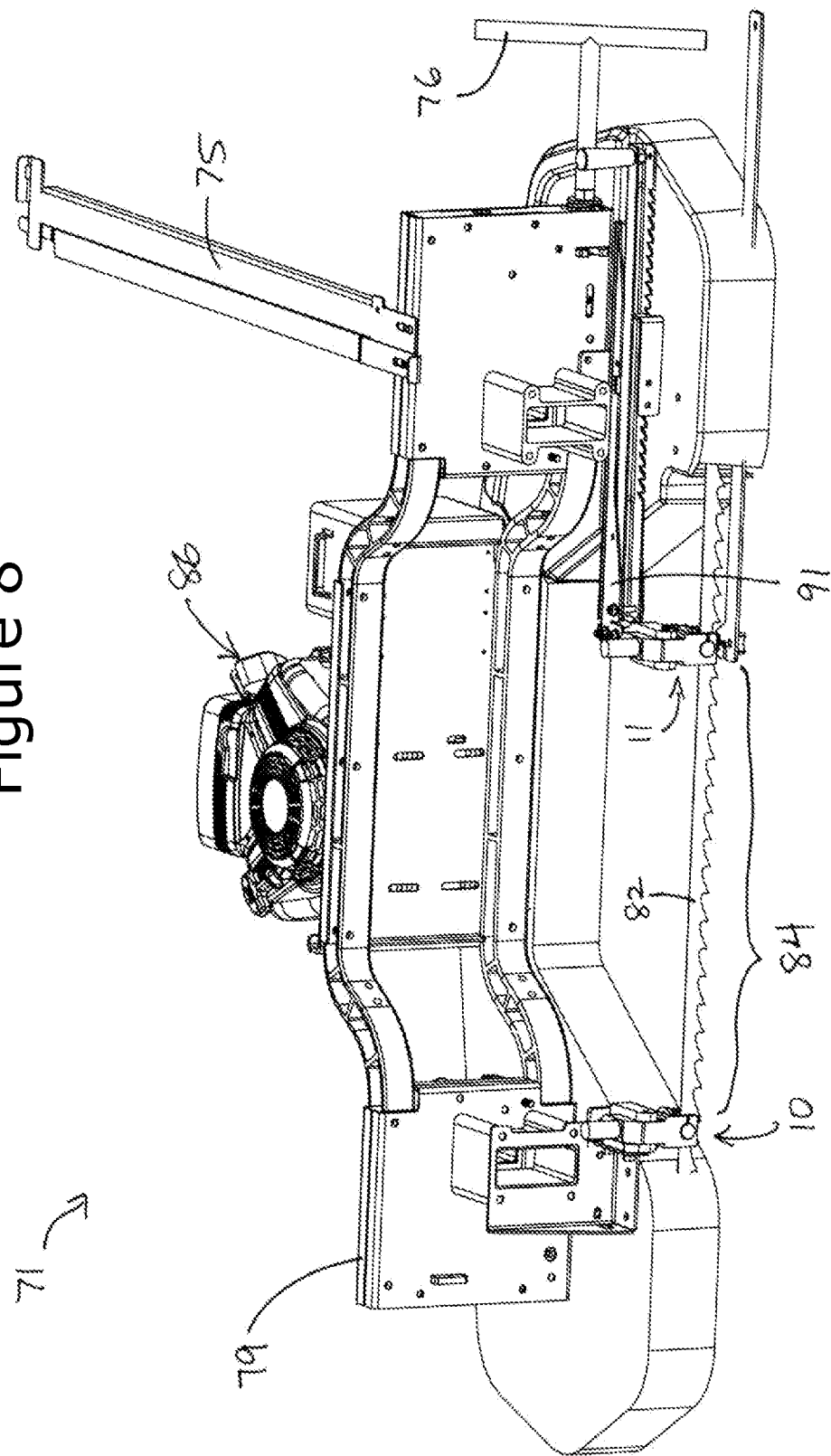
FIG. 8 is a bottom rear perspective view of the band saw head of FIG. 7.

Band saw head 71 is designed to be used as part of sawmill 70 (as shown in FIGS. 3 and 4). Briefly, band saw head 71 is fitted to carriage 72 which is capable of longitudinal displacement on rails 73 of sawmill base 74. Band saw head 71 is capable of vertical displacement in relation to sawmill base 74 through displacement along depth of cut ruler 75. Tension on the blade is controlled by saw head tension T handle 76. Saw head 71 can be moved vertically along vertical posts 77 by operation of crank 78.

Band saw head 71 has a saw head plate 79 (FIG. 5) which acts as support for a drive band wheel 80 and a free band wheel 81. A band saw blade 82 is entrained on and travels along an outer wheel 83 of drive band wheel 80 and free wheel 81, and travels along a cutting section 84, located between the drive band wheel 80 and free band wheel 81. Band saw blade 82 has transversely extending teeth capable of cutting a log. An inner wheel 85 of drive band wheel 80 is connected to a motor 86 by way of a belt 87 which runs along inner wheel 85 and centrifugal clutch 88 (FIG. 4). Tension on belt 87 is controlled by way of tensioning pulley 89. In use, motor 86 turns centrifugal clutch 88, which, when engaged, is a drive to turn drive band wheel 80 and, as a result, saw blade 82, which rotates around drive band wheel 80 and free band wheel 81.

Tensioning pulley 89 can also be used as a clutch for the saw blade 82. Instead of continuously shutting off and turning on motor 86 to activate the cutting action of saw blade 82, tension can be released from belt 87 by adjusting tensioning pulley 89. Releasing tension in belt 87 results in the free spinning of centrifugal clutch 88 and a decrease of rotatory force on saw blade 82, resulting in the stopping of saw blade 82. Starting and stopping saw blade 82 in this manner decreases wear on motor 86 and belt 87, improving the longevity of these parts.

Within the path of saw blade 82 is cutting section 84, which is the section in which saw blade 82 is generally free of obstruction and can be used to cut a log. On one side of the cutting section 84 is slideable blade guide 11 (FIG. 5; also seen in FIGS. 29 to 42). On the other (driven) side of cutting section 84 is fixed blade guide 10. In operation, saw blade 82 travels between slideable blade guide 11 and the fixed blade guide 10. In use, the blade guide rollers prevent undesired transverse and/or vertical movement of saw blade 82. In some embodiments, bandmills may have 2 fixed blade guides.

Fixed blade guide 10 is typically, and as shown, affixed to sawhead plate 79 via a vertical blade guide post 90. Slideable blade guide 11 is affixed to guide support 91, which is slidably engaged to guide slide 92, which, itself, is mounted on sawhead plate 79. Thus, slideable blade guide 11 is capable of horizontal displacement with respect to sawhead plate 79 through the displacement of guide support 91, along guide slide 92, thus allowing for variation of the length of cutting section 84. Also mounted on guide support 91 is guard 93 which extends horizontally away from cutting section 84 and protects blade 82. Guard 93 is adjustable and removable through the loosening of guard screw 94.

An embodiment of present fixed blade guide 10 for adjusting an elongate blade, with a longitudinal axis Y-Y, of a sawmill will now be described as shown in FIGS. 9-16.

Blade guide 10 generally includes a guide 12, a shaft 14 extending from guide 12, a shaft block 16 for receiving shaft 14, and a trunnion block 18 pivotably coupled to shaft block 16.

Guide 12 of the present embodiment is similar to conventional roller guide 106 in that it is a roller guide 20 with a collar 21 and a blade surface 22 extending from collar 21 for lateral/transverse contact with blade 82 of sawmill 70. Since guide 12 is roller guide 20, blade surface 22 is cylindrical in the Figures.

Guide 12 may include additional adjustment features, such as a lower jaw 31 extending generally perpendicularly away from front face 30 and parallel with blade surface 22. Lower jaw 31 has a lower opening 33 within which a lower thrust block 35 may be received. Lower jaw 31 is depicted to include a tightening mechanism that includes a lower front aperture 37 extending within lower jaw 31 generally parallel to bore 24 and situated adjacent to lower opening 33. Lower front aperture 37 is dimensioned to receive a front fastener 39 therethrough for securing lower thrust block 35 within lower opening 33. Lower thrust block 35 may be formed from ceramic or another low friction material to minimize friction when lower thrust block 35 comes into contact with blade 82.

Loosening front fastener 39 allows lower thrust block 35 to be adjusted by sliding lower thrust block 35 within lower opening 33. In that manner, lower thrust block 35 helps to guide blade 82 from below, while blade surface 22 of guide 12 helps to guide blade 82 from above.

Shaft 14 extends from, and is secured to, guide 12. As depicted, shaft 14 is cylindrical and concentrically aligned with guide 12. Alternately, shaft 14 may have a different geometric shape, such as a rectangular, polygonal, or partially rounded cross-section.

Shaft block 16 has a bore 24 extending therethrough, where bore 24 is dimensioned to slidably receive shaft 14. Since shaft 14 in the present embodiment is cylindrical, bore 24 is also correspondingly cylindrical in shape. However, bore 24 may have a different shape than that of shaft 14, so long as shaft 14 may be slidably received therein.

As presently depicted, shaft block 16 comprises a bottom face 26, an opposed top face 28, a front face 30 positioned proximate guide 12, an opposed back face 32, and a pair of sides 34 extending between front face 30 and back face 32. In such a case, bore 24 extends from front face 30 to back face 32 of shaft block 16. When guide 12 is positioned proximate front face 30, shaft 14 extends past front face 30, through bore 24, and beyond back face 32. In alternate applications, shaft 14 may not extend past back face 32.

Shaft block 16 is shown to further include a side aperture 36 extending through one of sides 34 generally perpendicular to bore 24. Side aperture 36 is dimensioned to receive a side fastener 38 therethrough for frictional engagement with shaft 14 within bore 24. Side fastener 38 is depicted to be a bolt with a head and an opposed end.

The presence of side aperture 36 and side fastener 38 helps to allow guide 12 and shaft 14 to be repositioned within bore 24 relative to shaft block 16. For example, to adjust the gap between collar 21 of guide 12 and front face 30 of shaft block 16, side fastener 38 may be loosened within side aperture 36. Shaft 14 may then be slidably shifted within bore 24. When the desired position of guide 12 relative to the blade and/or shaft block 16 is obtained, side fastener 38 may be inserted into side aperture 36 (if necessary) and tightened. Thus, the opposed end of the bolt frictionally engages with shaft 14 to hold shaft 14 in place within bore 24.

Trunnion block 18 is pivotably coupled to shaft block 16 about a pivot 40, which is orientated generally parallel to the longitudinal axis of the blade. Trunnion block 18 is further adapted to be securable to the sawmill.

In the present embodiment, trunnion block 18 comprises a top or header 42 with a pair of extensions 44 extending from top 42, having a shape similar to that of a flat arch or an inverted U. Extensions 44 are positioned parallel to, and flanking, sides 34 of shaft block 16. In that regard, trunnion block 18 extends at least from bottom face 26 to top face 28 of shaft block 16.

Trunnion block 18 is further depicted to be pivotably coupled to shaft block 16 proximate bottom face 26. In other words, pivot 40 is positioned near the distal end of extensions 44. In alternate applications, pivot point 40 may be positioned at a different location. For example, trunnion block 18 may be pivotably coupled to shaft block 16 proximate top face 28.

Trunnion block 18 is adapted to be securable to the sawmill. To that end, trunnion block 18 of the present embodiment includes a block opening 46. Block opening 46 is dimensioned to receive another fastener therethrough for securing trunnion block 18 to the sawmill. In particular, the depicted trunnion block 18 includes two block openings 46 positioned in or on one of extensions 44. Understandably, each block opening 46 is dimensioned to receive a fastener therethrough for securing trunnion block 18 to the sawmill.

In use, when shaft block 16 is pivoted about pivot 40 relative to trunnion block 18, such as X degrees, shaft block 16 pivots or moves shaft 14 relative to trunnion block 18 to generally the same pivot angle. The pivoting or moving of shaft 14 causes guide 12 to pivot at the generally the same pivot angle, which in turn, imparts the pivoting movement onto the blade to adjust the blade about its longitudinal axis.

Pivoting guide 12 may be achieved by simply manually pivoting or moving shaft block 16 or shaft 14 relative to trunnion block 18 about pivot 40. Since the pivoting adjustment is made adjacent to the plane that is to be adjusted (i.e. the plane of the blade), the slight distance between the point of adjustment and fulcrum allows for small and refined lateral angular adjustments to be made to the blade about its longitudinal axis.

For even finer control of the angular adjustment, blade guide 10 may further include an angular adjustment mechanism 50 (see FIGS. 12 and 13 for example) positioned or secured between shaft block 16 and trunnion block 18, where angular adjustment mechanism 50 configured to modify the pivot angle between shaft block 16 and trunnion block 18.

In the present embodiment, angular adjustment mechanism 50 comprises a pair of protrusions 52 extending from top face 28 of shaft block 16. In particular, one of the pair of protrusions 52 may extend from, and is aligned with, front face 30 of shaft block 16. The other of the pair of protrusions 52 may also extend from, and is aligned with, back face 32 of shaft block 16. In that manner, header 42 of trunnion block 18 may be positioned between the pair of protrusions 52 for operative engagement therewith.

Figure 16:
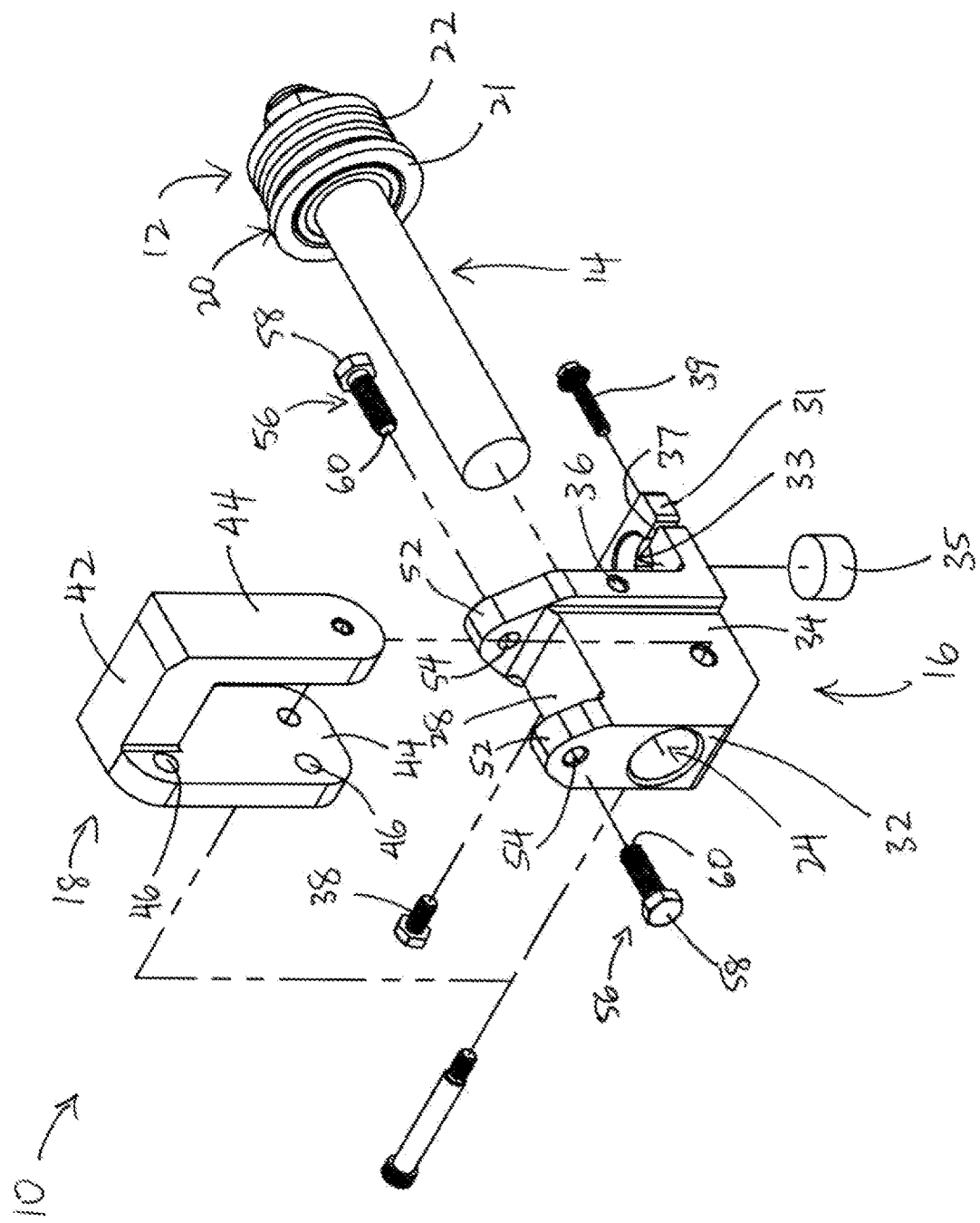
FIG. 16 is an exploded rear perspective view of the fixed blade guide of FIG. 11.

As seen in FIG. 16, to operatively engage with header 42, each of the depicted protrusions 52 includes an engagement aperture 54, and angular adjustment mechanism 50 further includes a pair of adjustment bolts 56. Each adjustment bolt 56 has a head 58 and an opposed distal end 60. One of the pair of adjustment bolts 56 extends through each engagement aperture 54 for contacting header 42 of trunnion block 18 and to engage therewith.

Adjustment bolts 56 are shown in the Figures to be threaded. Thus, the present angular adjustment mechanism 50 is engaged by rotating one or both heads 58 of adjustment bolts 56.

Engaging angular adjustment mechanism 50 pivots shaft block 16 and shaft 14 relative to trunnion block 18, thereby causing guide 12 to pivot and impart the pivoting movement onto the blade to adjust the blade about its longitudinal axis. Since the pivoting adjustment is made adjacent to the plane that is to be adjusted (i.e. the plane of the blade), the small distance between the point of adjustment and fulcrum allows for small and refined adjustments to be made to the blade about its longitudinal axis.

Another embodiment 10*a* of the present fixed blade guide for adjusting an elongate blade is shown in FIGS. 17-22. The depicted blade guide 10*a* is largely similar to blade guide 10 shown in FIGS. 9-16. However, rather than roller guide 20, guide 12 is a block guide 41. Block guide 41 is shown having an upper jaw 43 and lower jaw 31, where lower jaw 31 is secured to or integral with upper jaw 43, rather than extending from shaft block 16.

Similar to lower jaw 31, upper jaw 43 has an upper opening 45 within which an upper thrust block 47 may be received. Upper jaw 43 is depicted to include a tightening mechanism that includes an upper front aperture 49 extending within upper jaw 43 generally parallel to bore 24 and situated adjacent to upper opening 45. Upper front aperture 49 is dimensioned to receive another front fastener 39 therethrough for securing upper thrust block 47 within upper opening 45. Upper thrust block 47 may also be formed from ceramic or another low friction material to minimize friction when upper thrust block 47 comes into contact with blade 82.

Loosening front fastener 39 allows upper thrust block 47 to be adjusted by sliding upper thrust block 47 within upper opening 45. In that manner, upper thrust block 47 helps to guide blade 82 from above, while lower thrust block 35 helps to guide blade 82 from below.

Additionally, block guide 41 may further include a vertical thrust block 48 positioned between upper jaw 43 and lower jaw 31. Vertical thrust block 48 may also be formed from ceramic or another low friction material to minimize friction when vertical thrust block 48 comes into contact with blade 82.

A further embodiment 10*b* of the fixed blade guide for adjusting an elongate blade is shown in FIGS. 23-28. The depicted blade guide 10*b* is largely similar to blade guide 10 shown in FIGS. 9-16, where lower jaw 31 of fixed blade guide 10 is integrally formed with, or securely extends from, front face 31 of shaft block 16. In the embodiment of FIGS.

23-28, however, lower jaw 31 is a separate component that is releasably secured to shaft block 16, thus allowing for adjustment of lower jaw 31 relative to guide 12.

As shown, blade guide 10a includes a tab 51 extending from lower jaw 31 with a tab aperture 53. Tab 51 is dimensioned to extend along bottom face 26 of shaft block 16, generally parallel with shaft bore 24. Tab aperture 53 is also shown to have an oblong shape, orientated parallel with tab 51. In the present case, shaft block 16 includes a bottom aperture extending through bottom face 26 generally perpendicular to bore 24. The bottom aperture and tab aperture 53 are dimensioned to receive a bottom fastener 55 therethrough for releasably securing lower jaw 31 to shaft block 16.

Optionally, as depicted, shaft block 16 may include an indentation or groove 57 situated in, and orientated parallel with, bottom face 26 of shaft block 16. Groove 57 is dimensioned to slidably receive tab 51 therein.

Loosening bottom fastener 55 allows tab 51 to slide relative to bottom face 26 of shaft block 16. In other words, bottom fastener 55 may slide along oblong tab aperture 53 and tab 51 may slide along groove 57 to adjust the positioned of lower jaw 31 towards or away from front face 30 of shaft block 16. Once lower jaw 31 is spaced apart from shaft block 16 as desired, bottom fastener 55 may be tightened to secure tab 51 and lower jaw 31 in place.

As understood by the skilled person, lower jaw 31 may be releasably secured to shaft block 16 by a different mechanism, such as a snap-fit or clasp mechanism.

Figure 9:
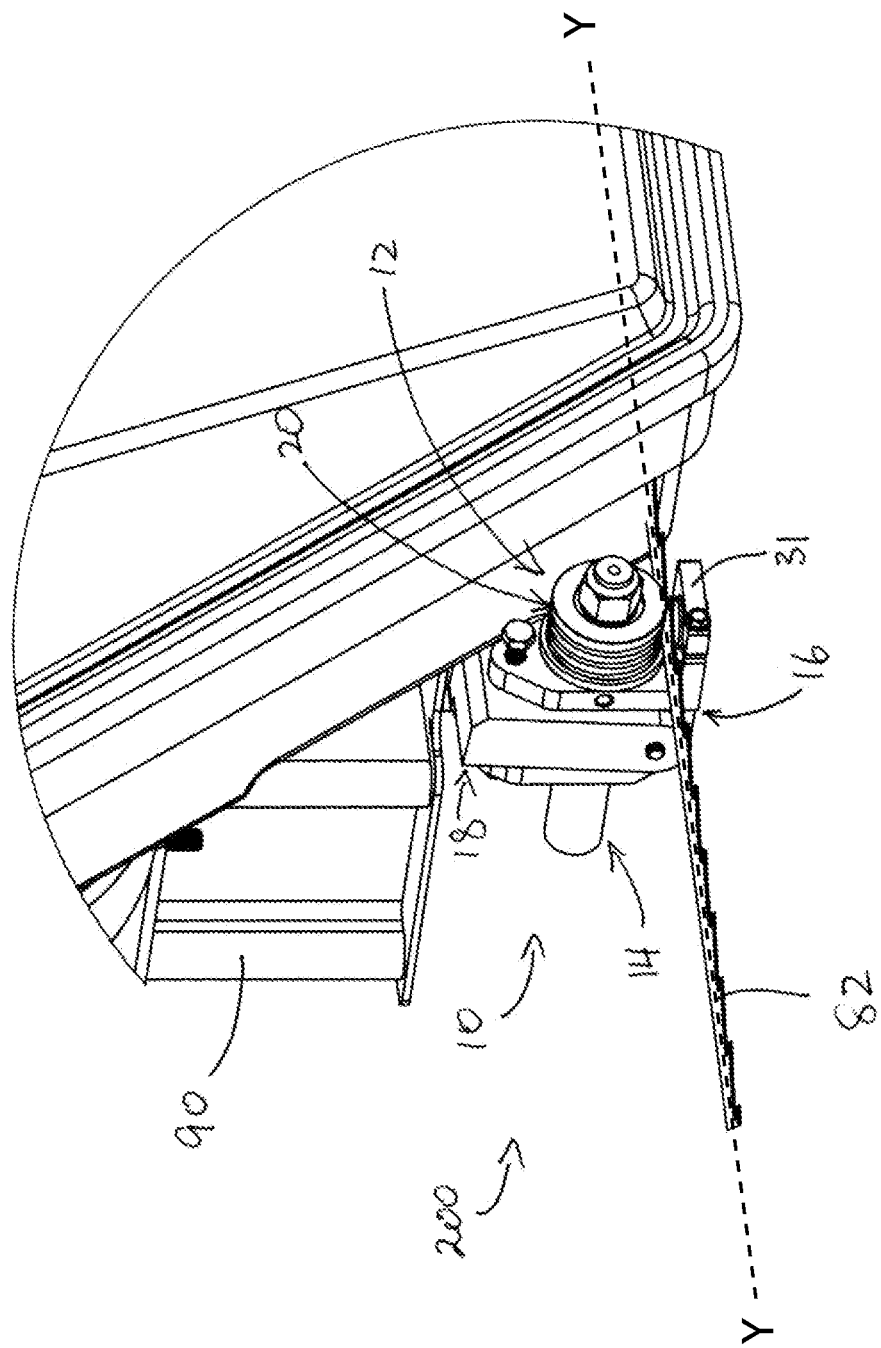
FIG. 9 is an enlarged front, left perspective view of portion A of FIG. 5, showing one embodiment of the fixed blade guide in a fixed blade guide assembly.
Figure 10:
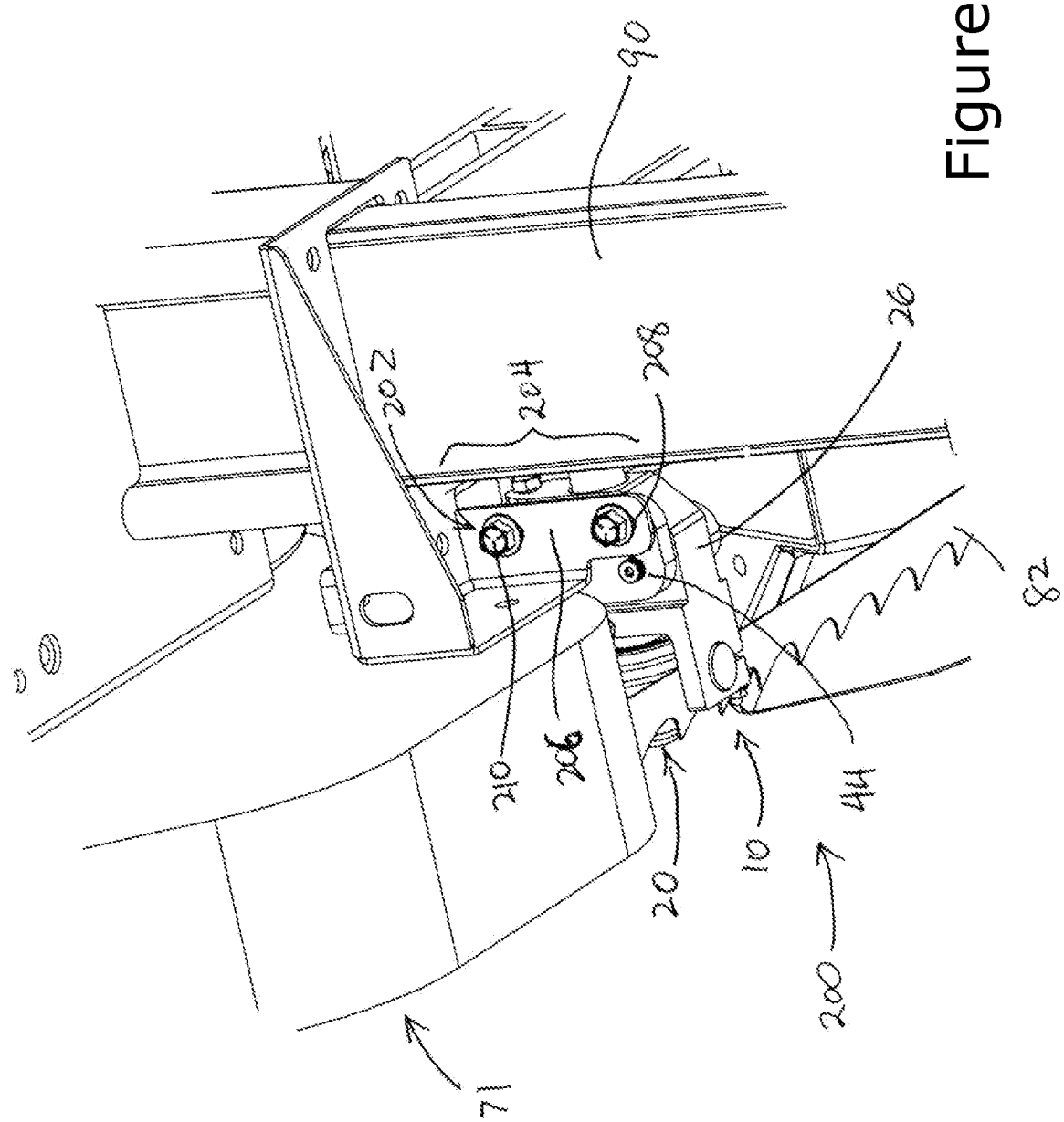
FIG. 10 is bottom, right perspective view of the fixed blade guide secured to the saw head in the fixed blade guide assembly of FIG. 9.
Figure 11:
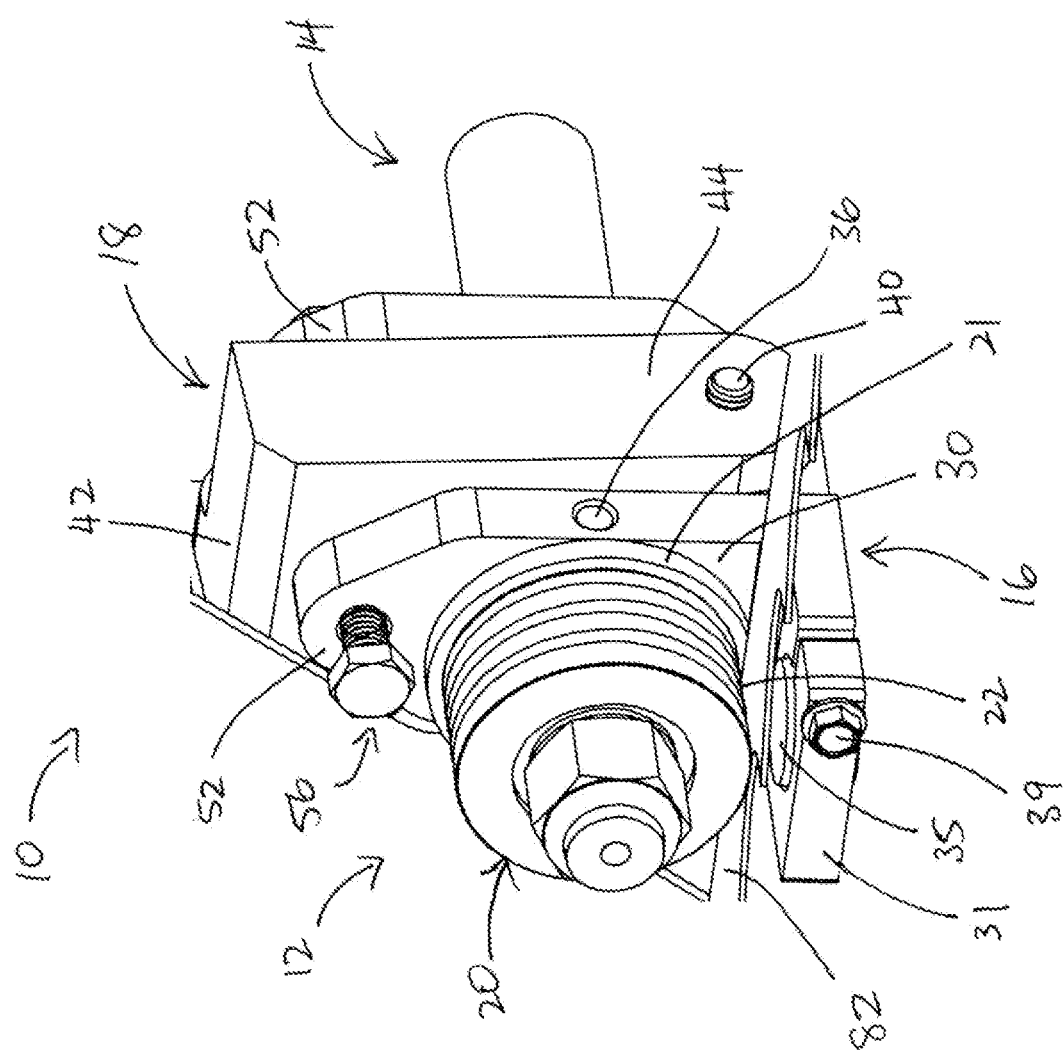
FIG. 11 is an enlarged front, right perspective view of the fixed blade guide of FIG. 9 in isolation.
Figure 12:
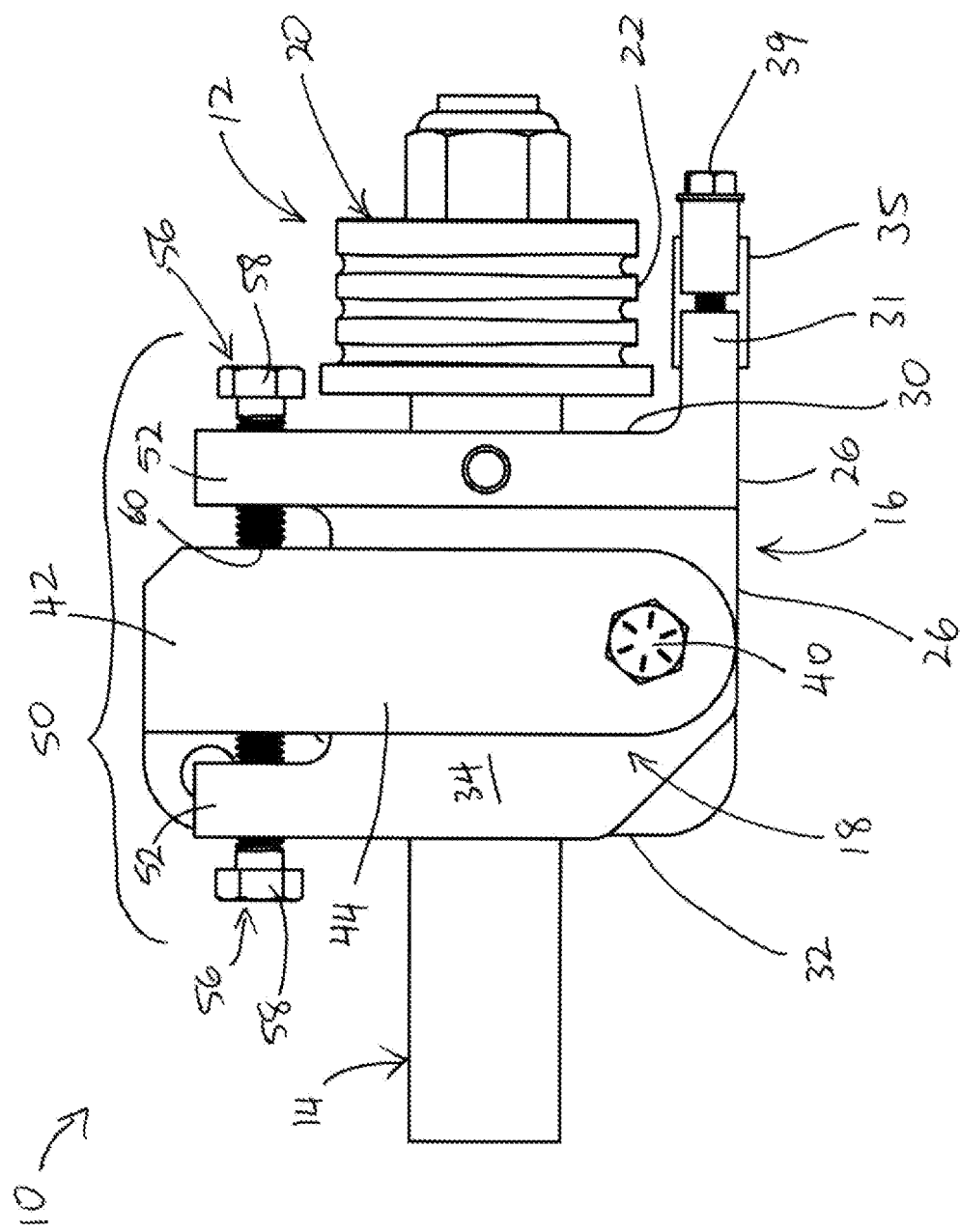
FIG. 12 is a left side elevational view of the fixed blade guide of FIG. 11 in a neutral configuration.
Figure 13:
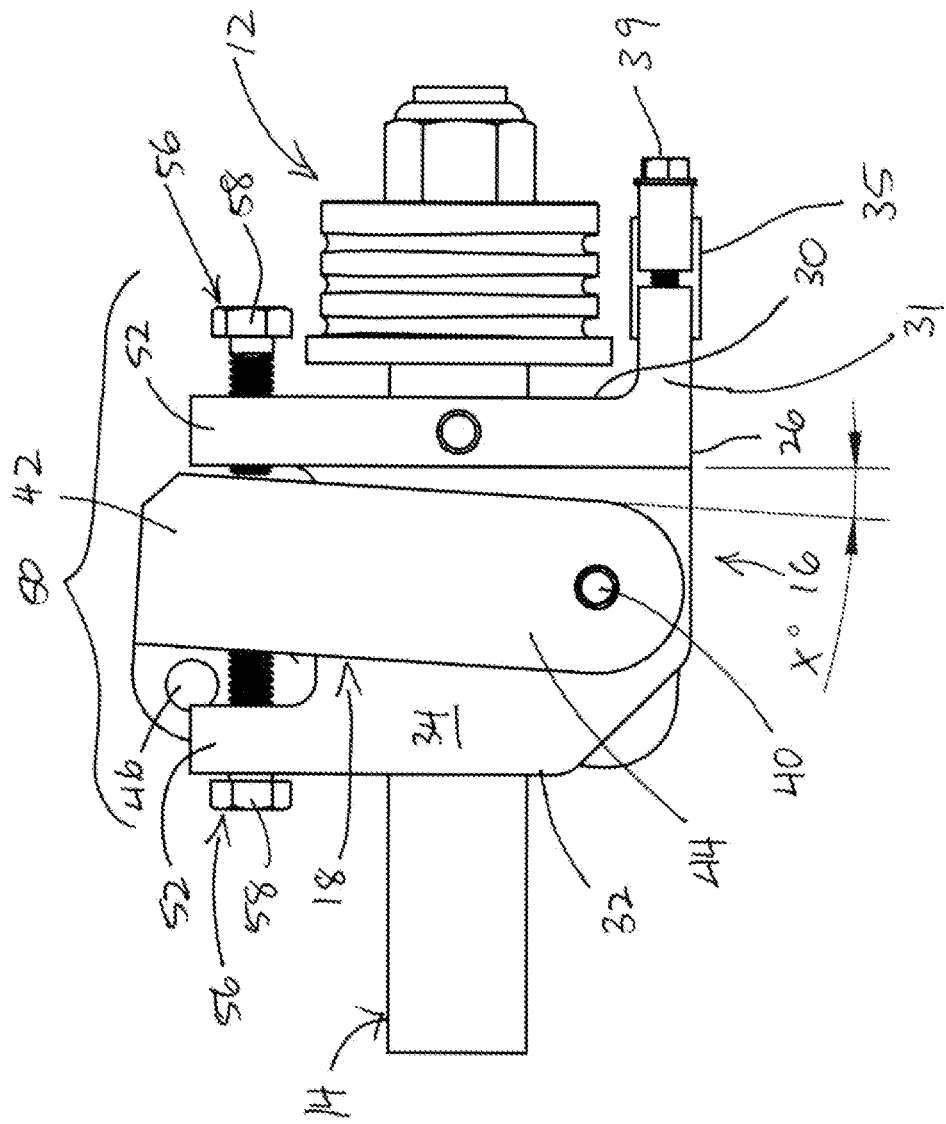
FIG. 13 is a view of the fixed blade guide of FIG. 12 in a modified configuration.
Figure 14:
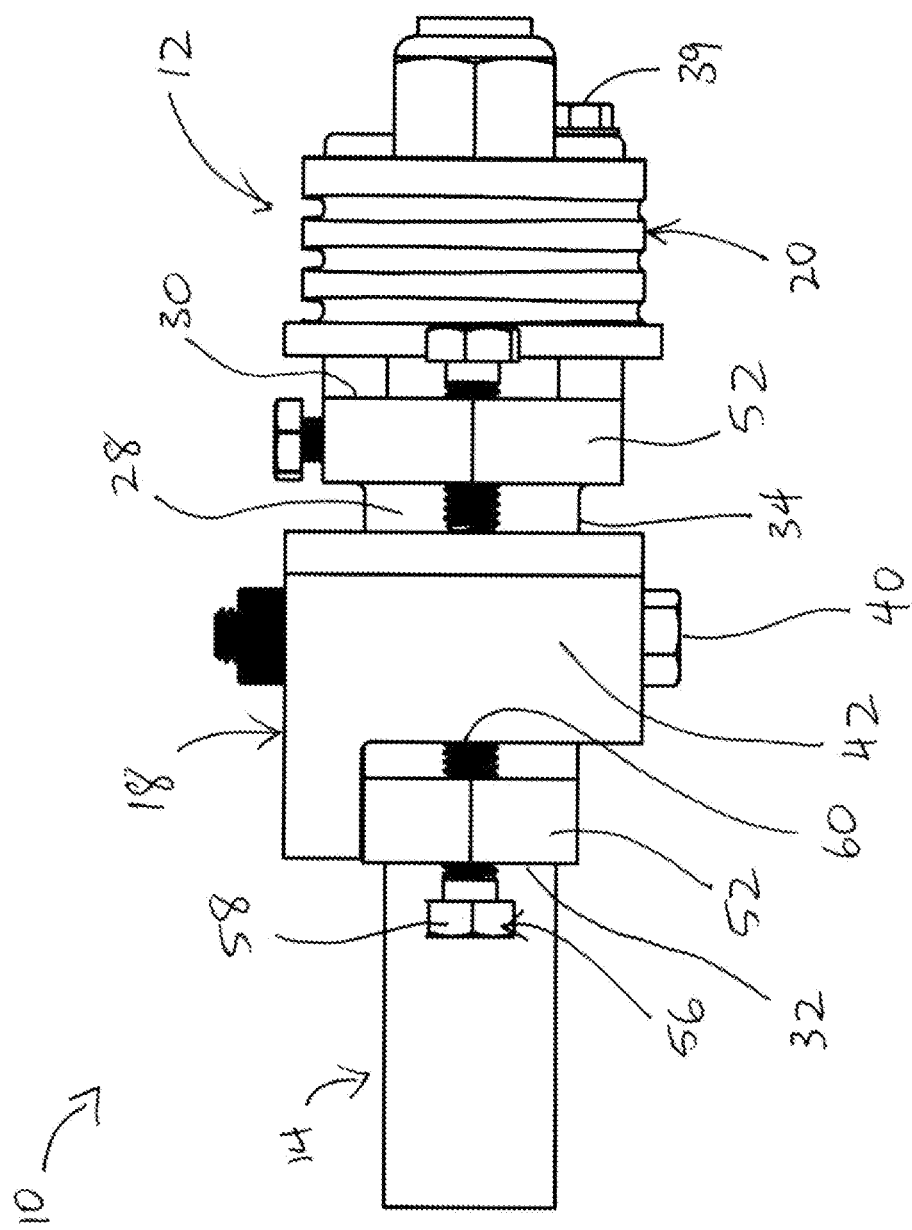
FIG. 14 is a plan view of the fixed blade guide of FIG. 12.
Figure 15:
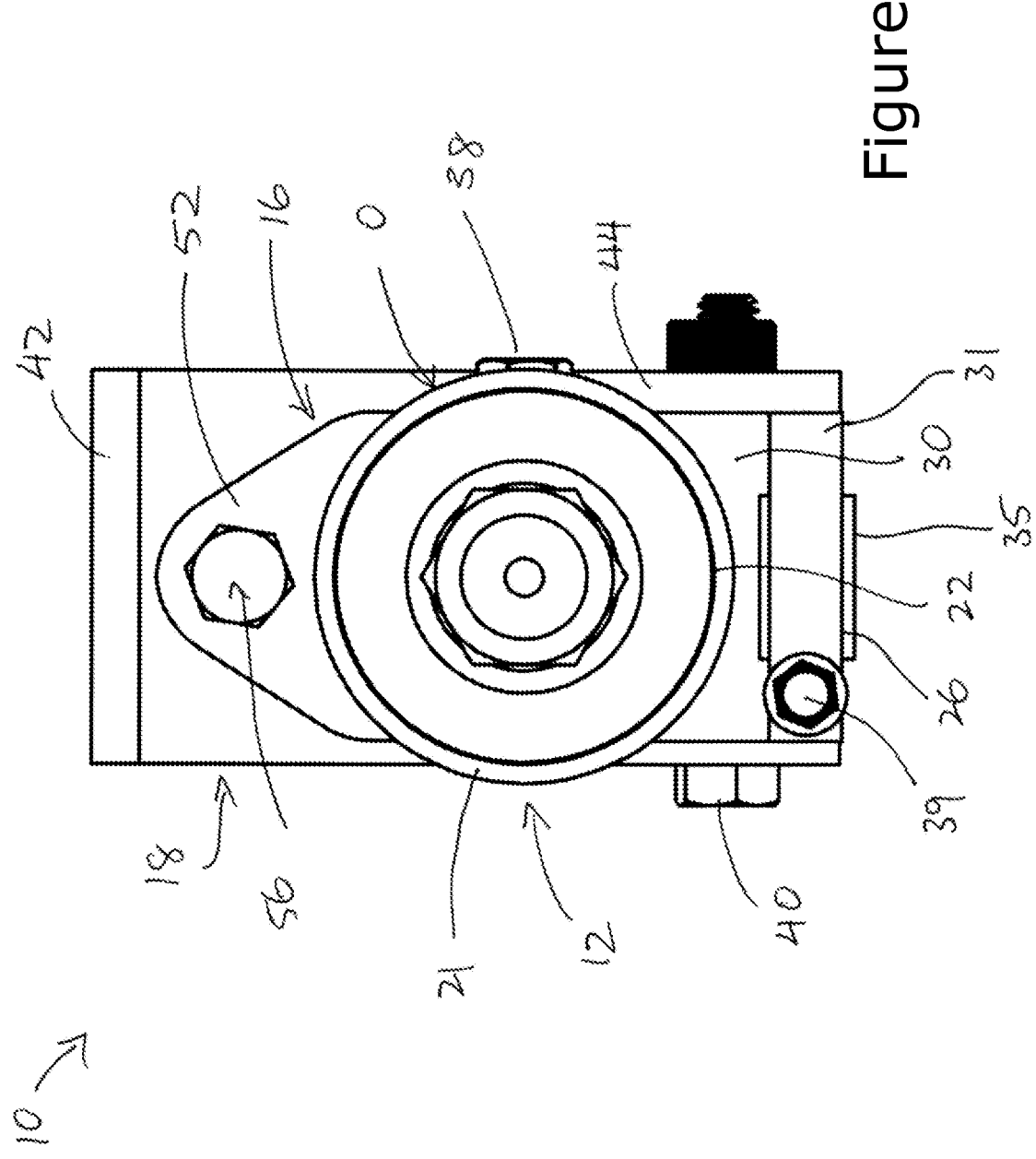
FIG. 15 is a front elevational view of the fixed blade guide of FIG. 12.

FIGS. 9 and 10 illustrate a fixed blade guide assembly 200 with fixed blade guide 10, according to an embodiment of the present invention. Fixed blade guide assembly 200 is shown in use with band saw head 71 for adjusting blade 82 having a longitudinal axis Y-Y.

Fixed blade guide assembly 200 generally includes the components of fixed blade guide 10 as described above. In addition, fixed blade guide assembly 200 also includes a sawmill member 202 to which trunnion block 18 is secured, and a vertical adjustment mechanism 204 positioned between sawmill member 202 and trunnion block 18. Vertical adjustment mechanism 204 is configured to modify the vertical position of trunnion block 18 relative to sawmill member 202.

In the presently depicted embodiment, sawmill member 202 is a flange 206 that is secured to vertical blade guide post 90. Flange 206 is orientated parallel to, and abutting, extension 44 of trunnion block 18 that has block opening 46.

Vertical adjustment mechanism 204, in turn, comprises an oblong opening 208 in sawmill member 202, where oblong opening 208 is orientated longitudinally perpendicular to shaft 14. Since sawmill member 202 is presently depicted as flange 206, oblong opening 208 is shown situated in flange 206, albeit covered by a washer, and aligned with block opening 46.

In alternate applications, the shapes of block openings 46 in trunnion block 18 and oblong openings 208 in flange 206 may be switched, where block openings 46 may be oblong in shape, while the openings in flange 206 may be circular.

Vertical adjustment mechanism 204 further includes a vertical adjustment fastener 210 that extends, and is secured through, block opening 46 and oblong opening 208. The presence and shape of oblong opening 208 allows trunnion block 18 to be secured to sawmill member 204 at differing or various vertical positions relative to sawmill member 202 and, hence, sawmill 70.

While vertical adjustment mechanism 204 may only include one block opening 46, one oblong opening 208, and one vertical adjustment fastener 210 extending therethrough, for greater stability, the present embodiment further shows trunnion block 18 to include an additional block opening 46. Correspondingly, vertical adjustment mechanism 204 also further includes an additional oblong opening 208 in sawmill member 202 that is orientated longitudinally perpendicular to shaft 14 and parallel to the first oblong opening 208. Vertical adjustment mechanism 204 further includes an additional vertical adjustment fastener 210 that extends and is secured through additional block opening 46 and additional oblong opening 208.

In order to vertically shift trunnion block 18 relative to sawmill member 204 or flange 206, vertical adjustment fasteners 210 may be loosened, and trunnion block 18 may be manually adjusted to the desired vertical position as allowed by oblong apertures 208. Vertical adjustment fasteners 210 may then be tightened to secure trunnion block 18 to flange 206.

Figure 17:
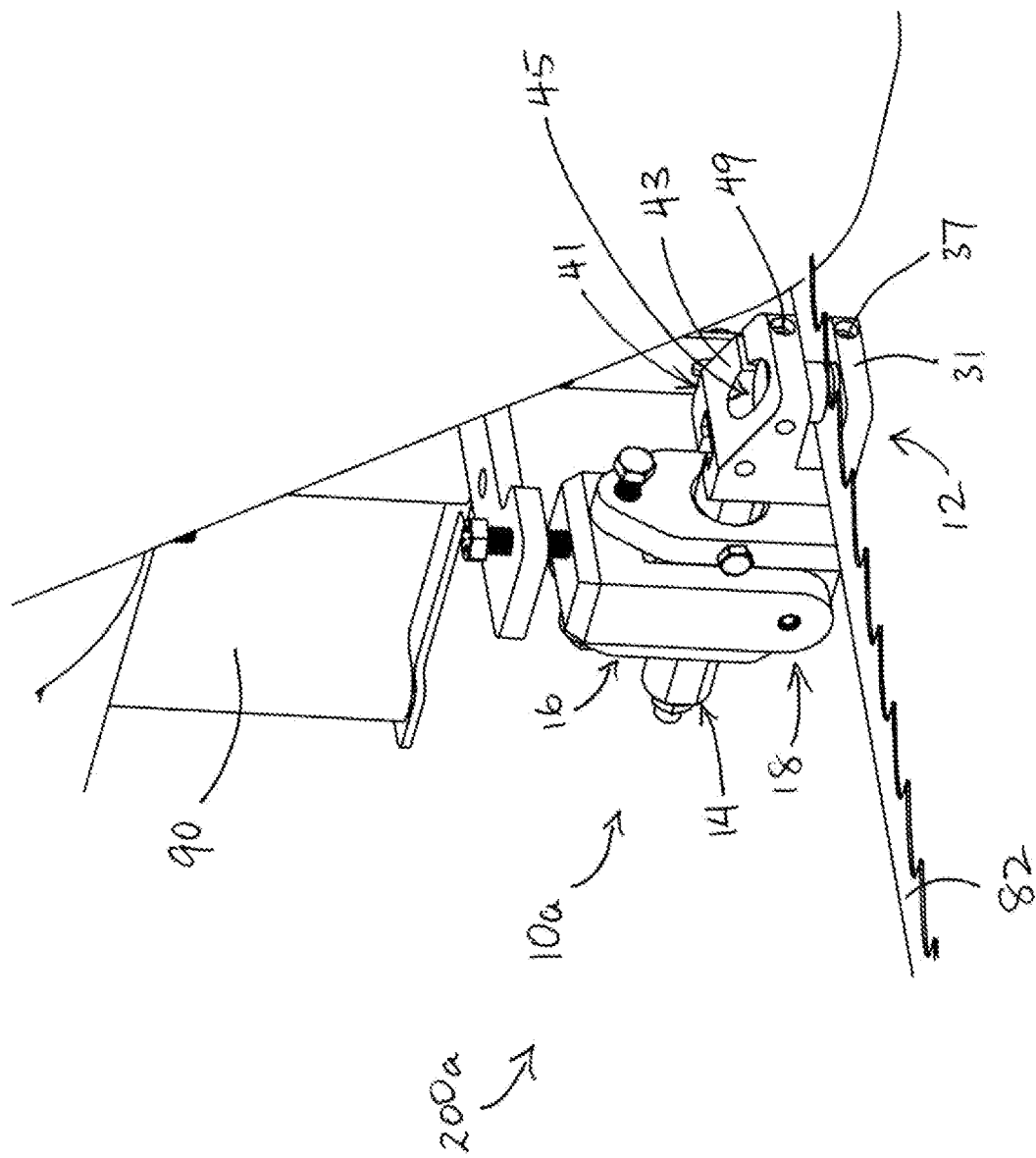
FIG. 17 is a view of FIG. 9 with another embodiment of the fixed blade guide with a block guide in another fixed blade guide assembly.
Figure 18:
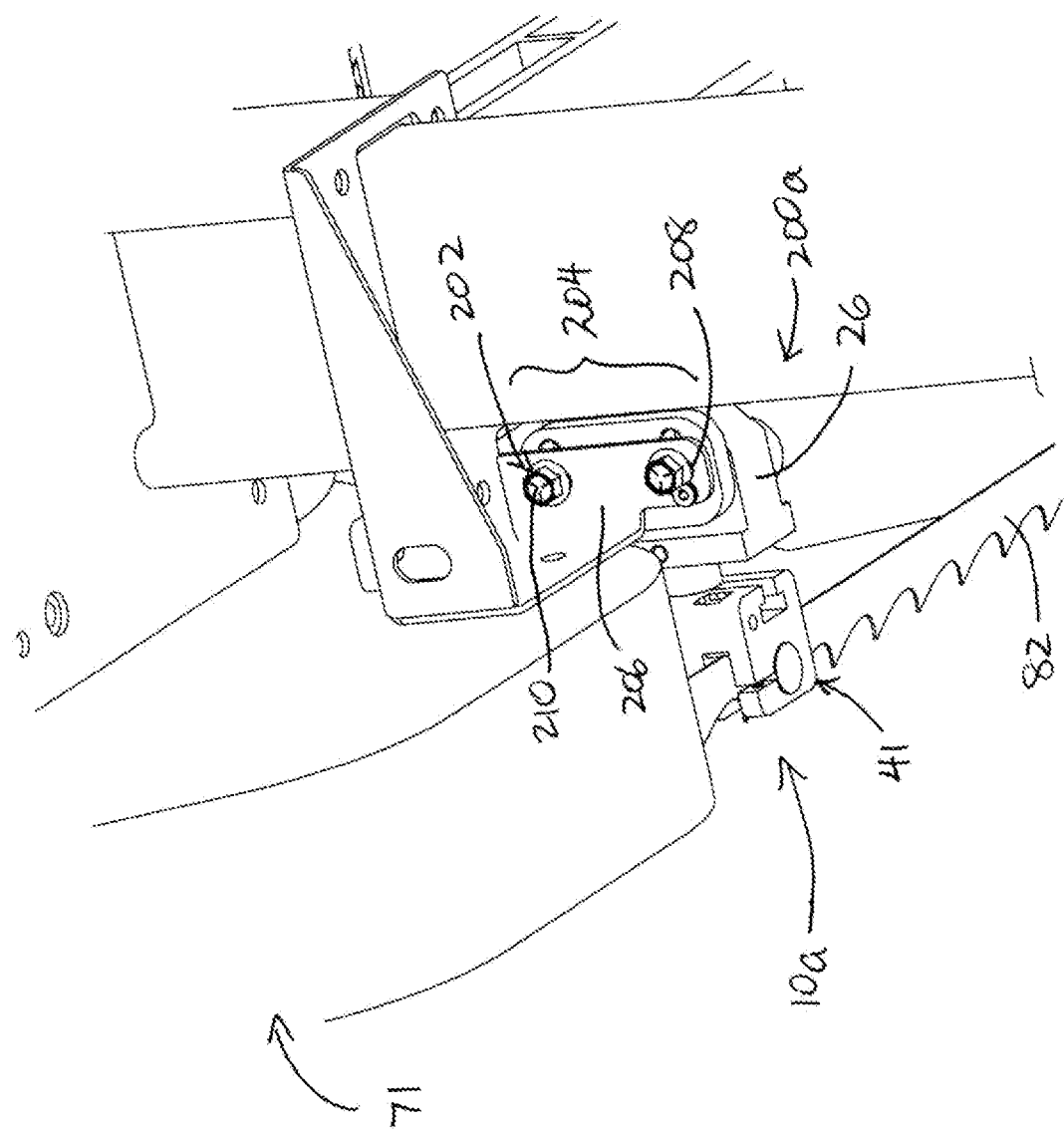
FIG. 18 is bottom, right perspective view of the fixed blade guide of FIG. 17 secured to the saw head.
Figure 19:
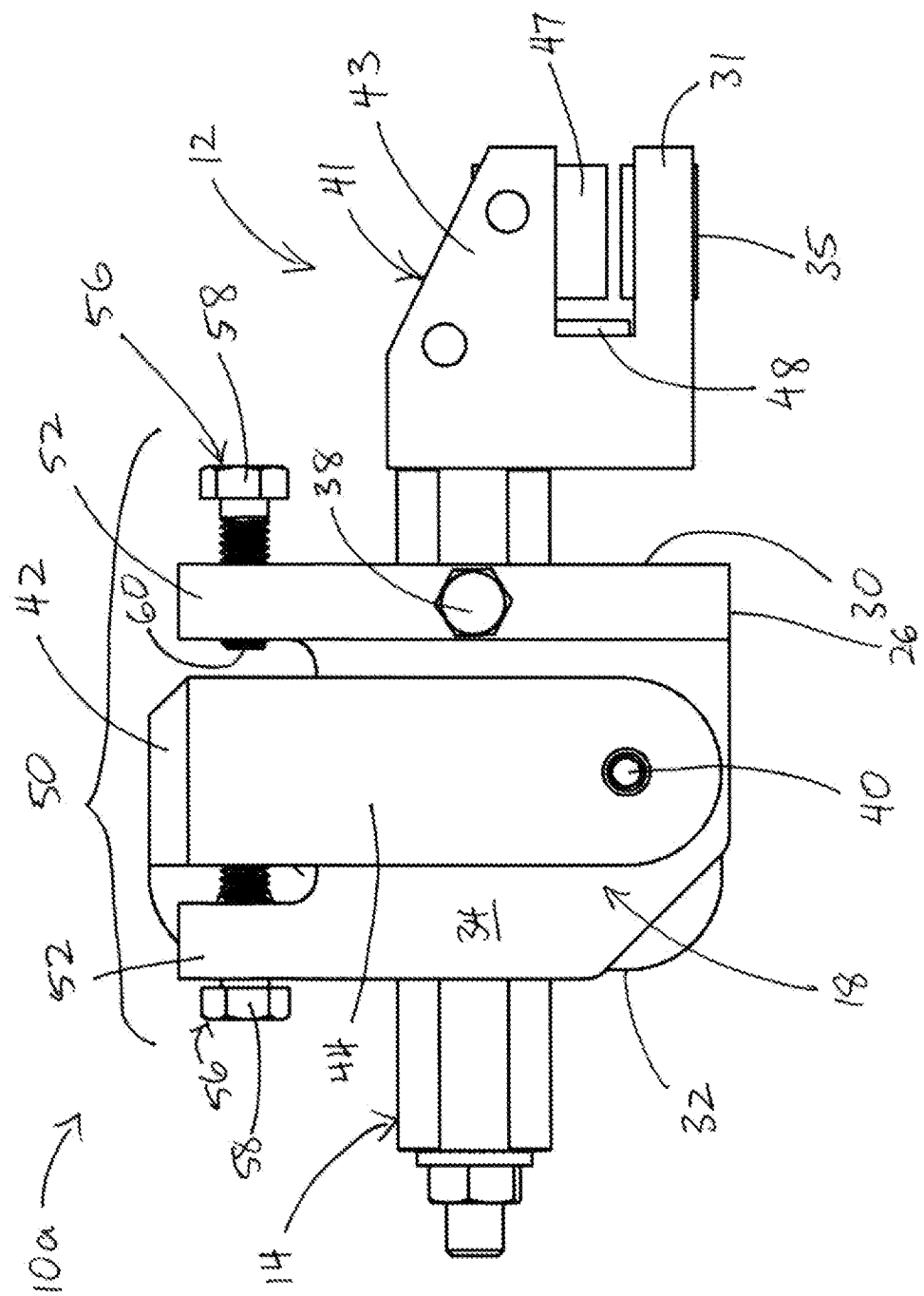
FIG. 19 is a left side elevational view of the fixed blade guide of FIG. 17 in isolation.
Figure 20:
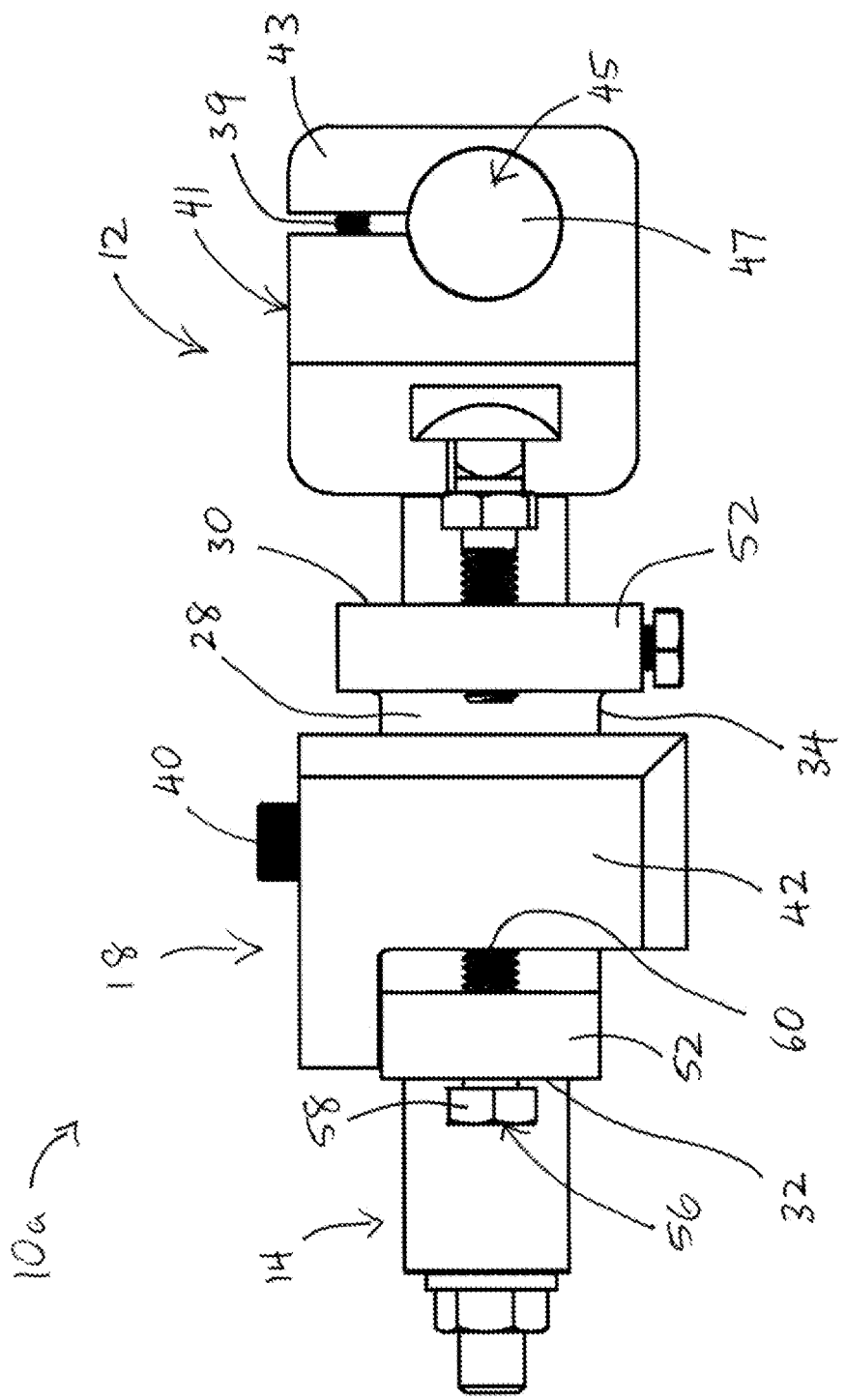
FIG. 20 is a plan view of the fixed blade guide of FIG. 19.
Figure 21:
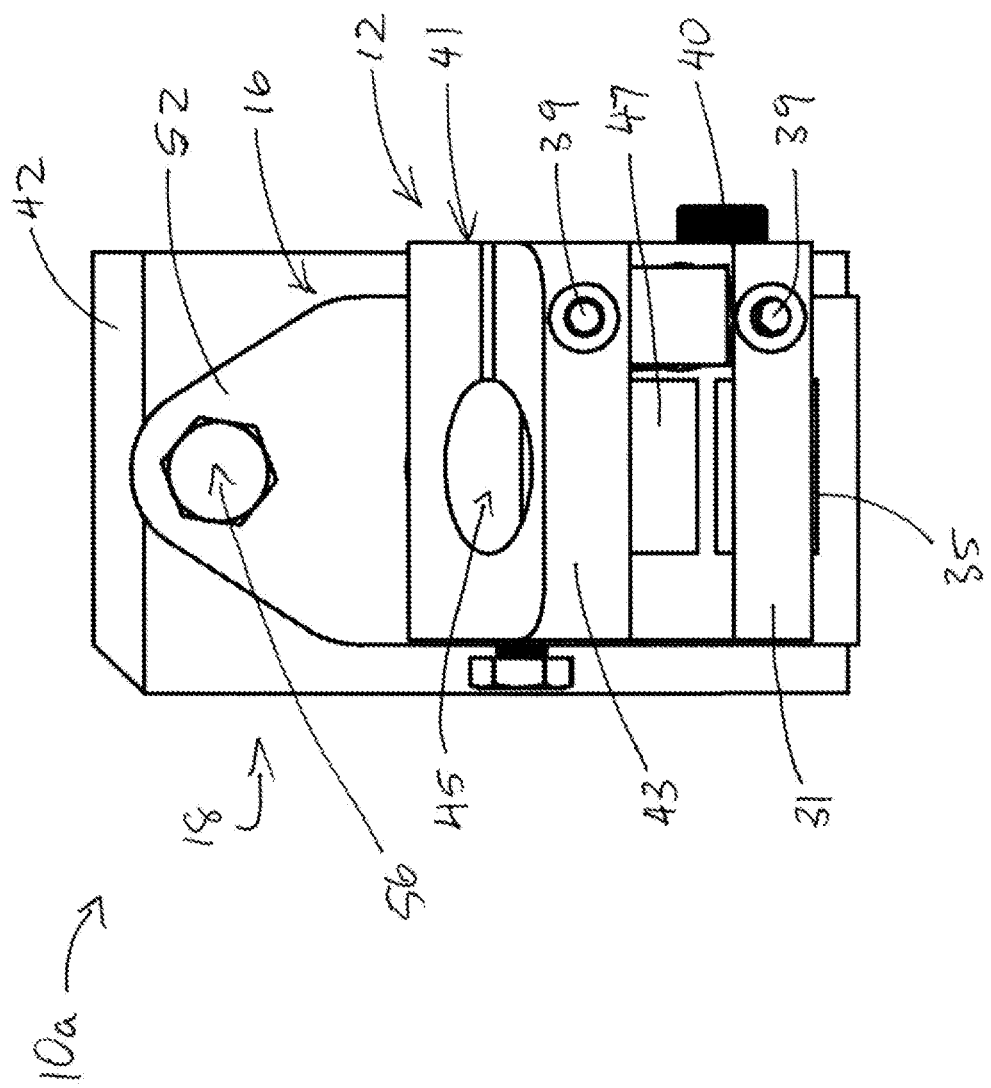
FIG. 21 is a front elevational view of the fixed blade guide of FIG. 19.
Figure 22:
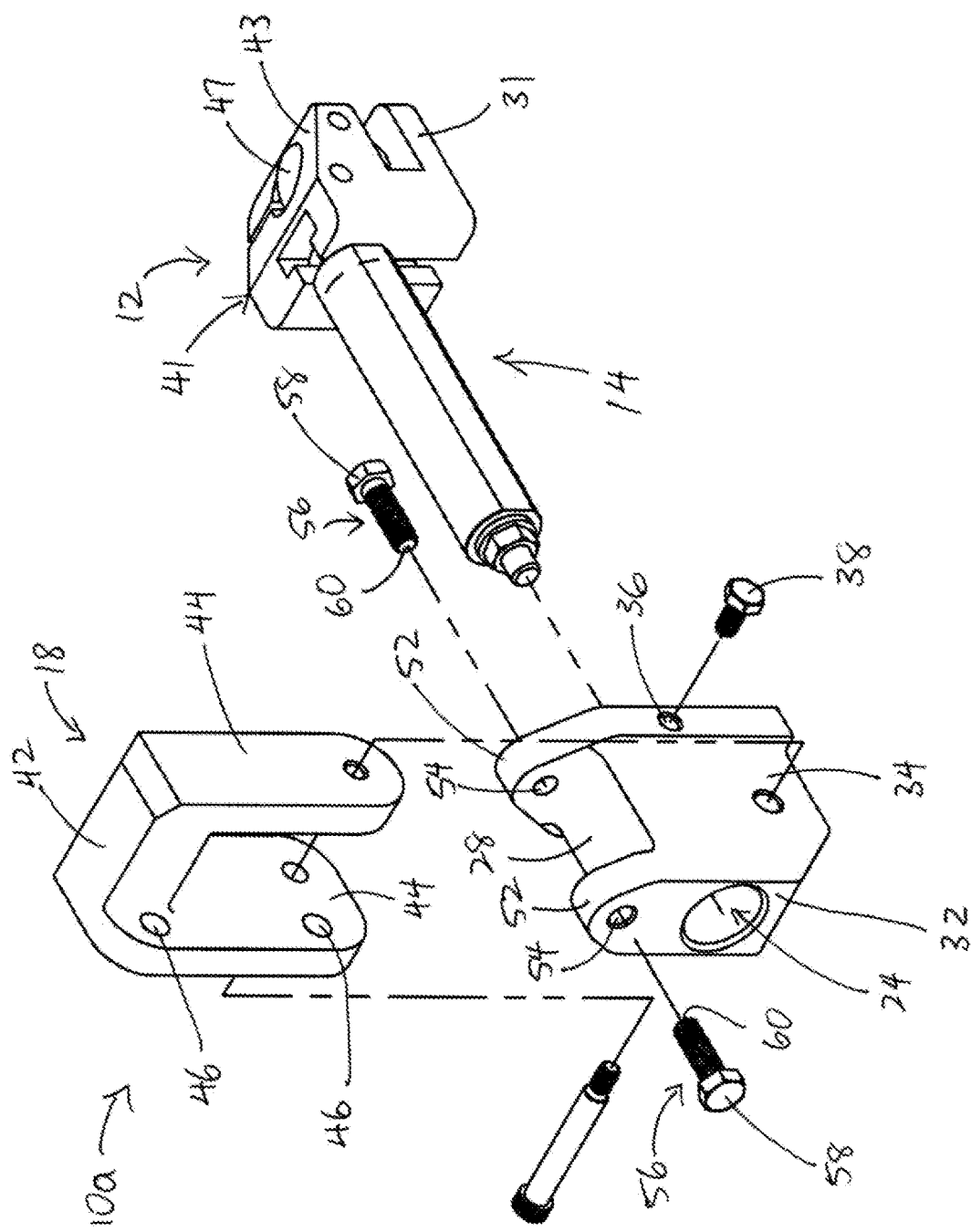
FIG. 22 is an exploded rear perspective view of the fixed blade guide of FIG. 19.
Figure 23:
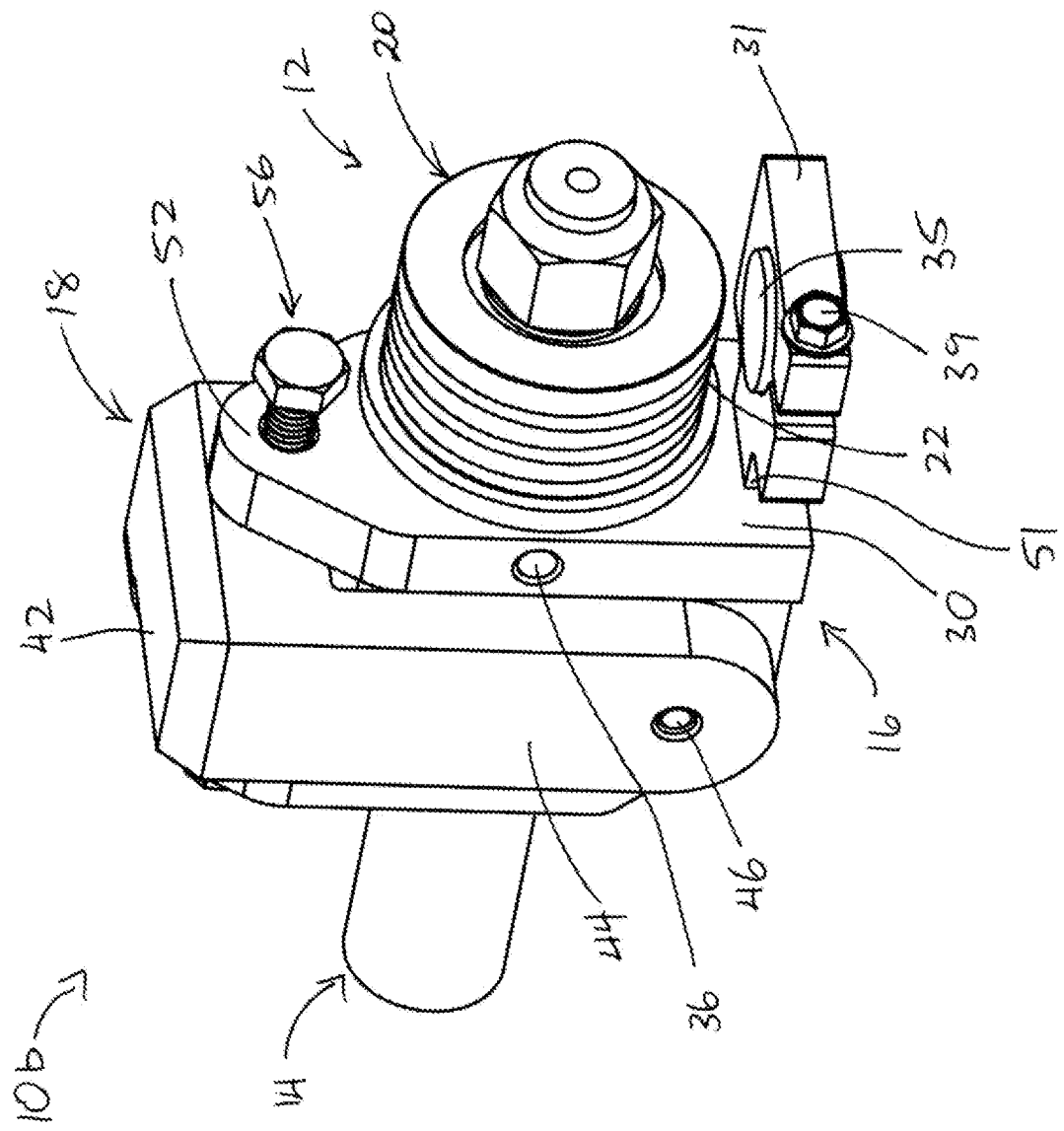
FIG. 23 is a front, left perspective view of another embodiment of the fixed blade guide with an adjustable lower ceramic.
Figure 24:
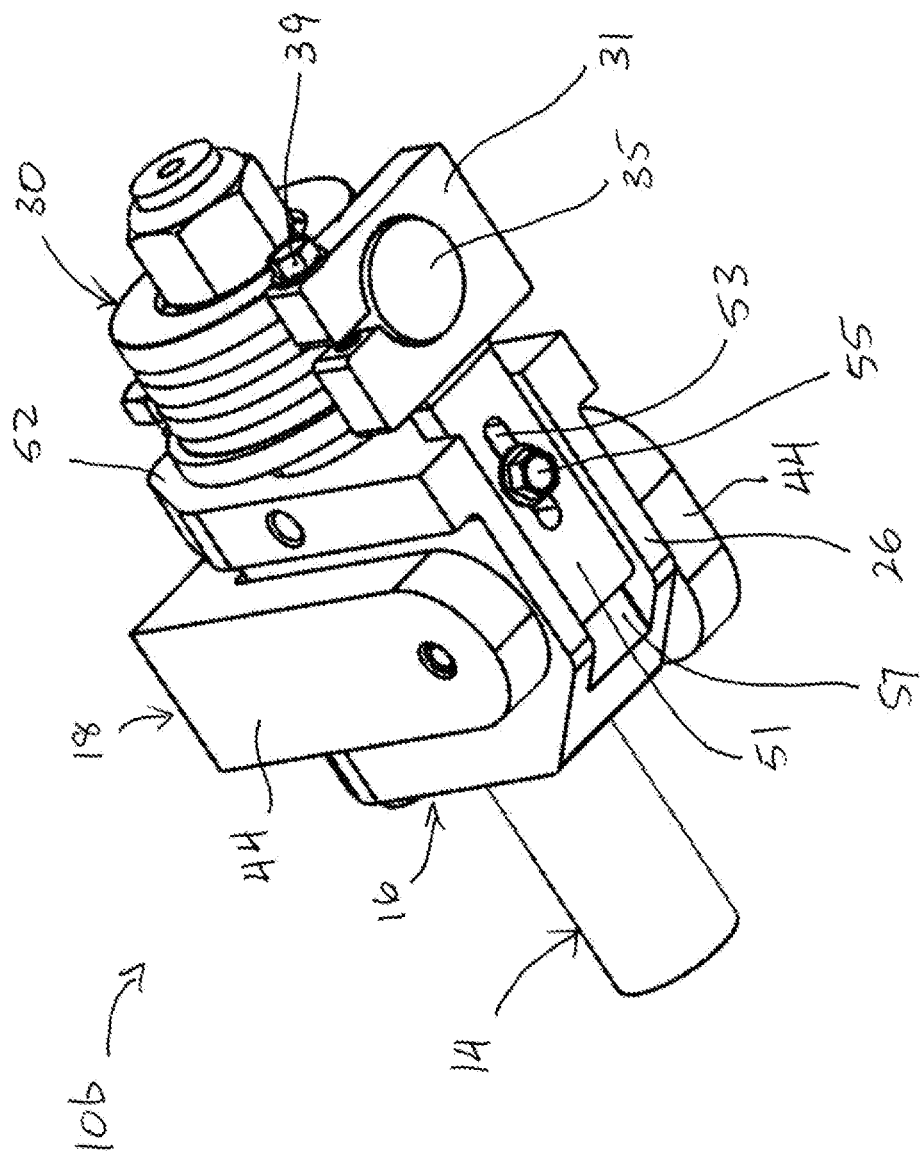
FIG. 24 is a bottom, left perspective view of the fixed blade guide of FIG. 23.
Figure 25:
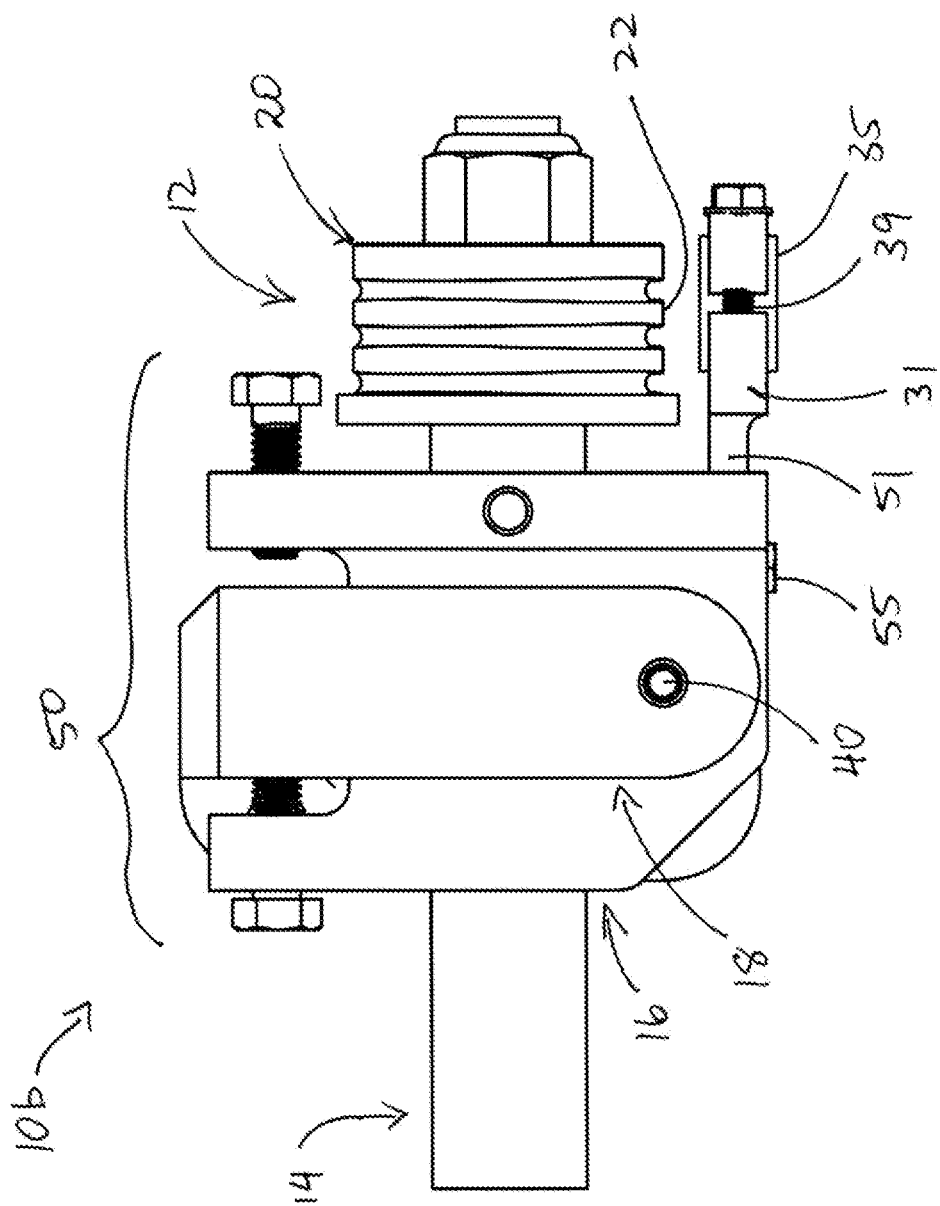
FIG. 25 is a left side elevational view of the fixed blade guide of FIG. 23.
Figure 26:
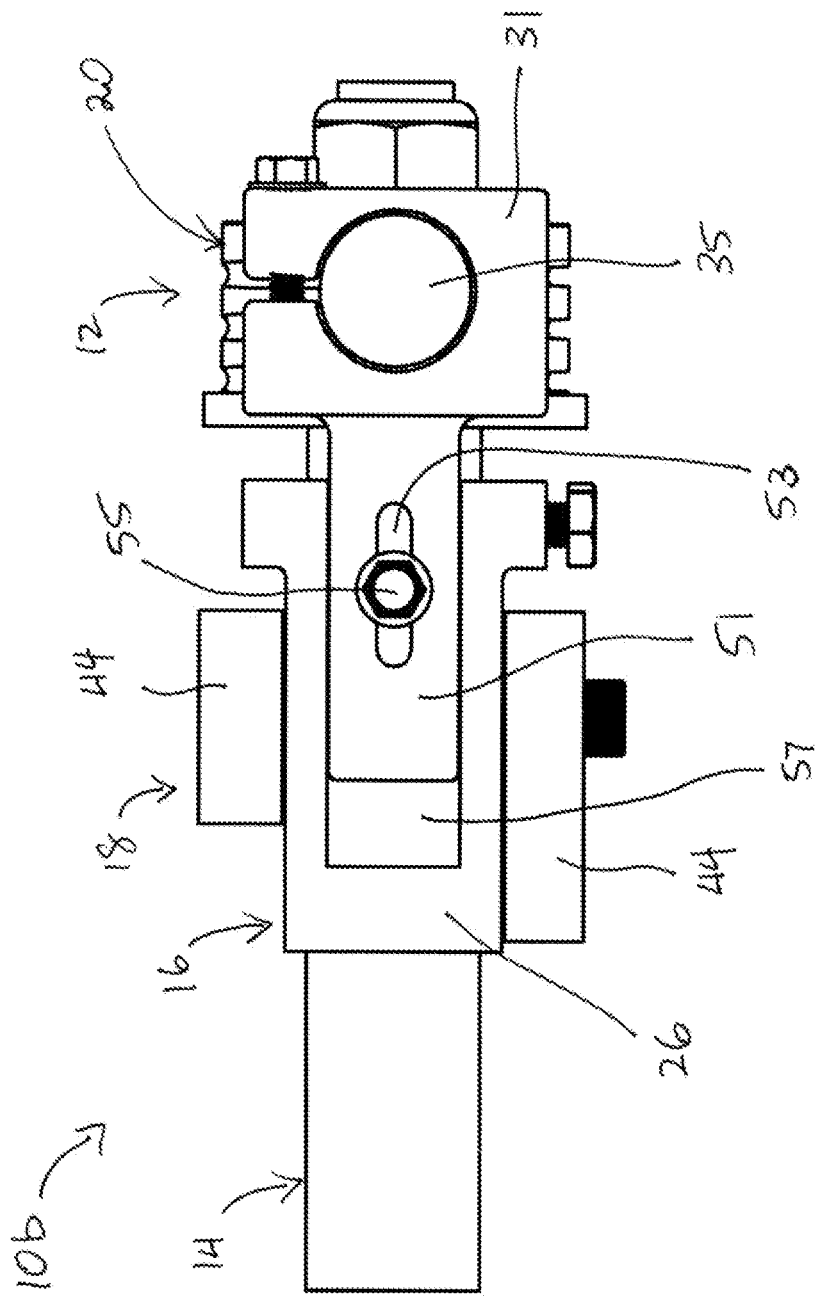
FIG. 26 is a bottom view of the fixed blade guide of FIG. 23.
Figure 27:
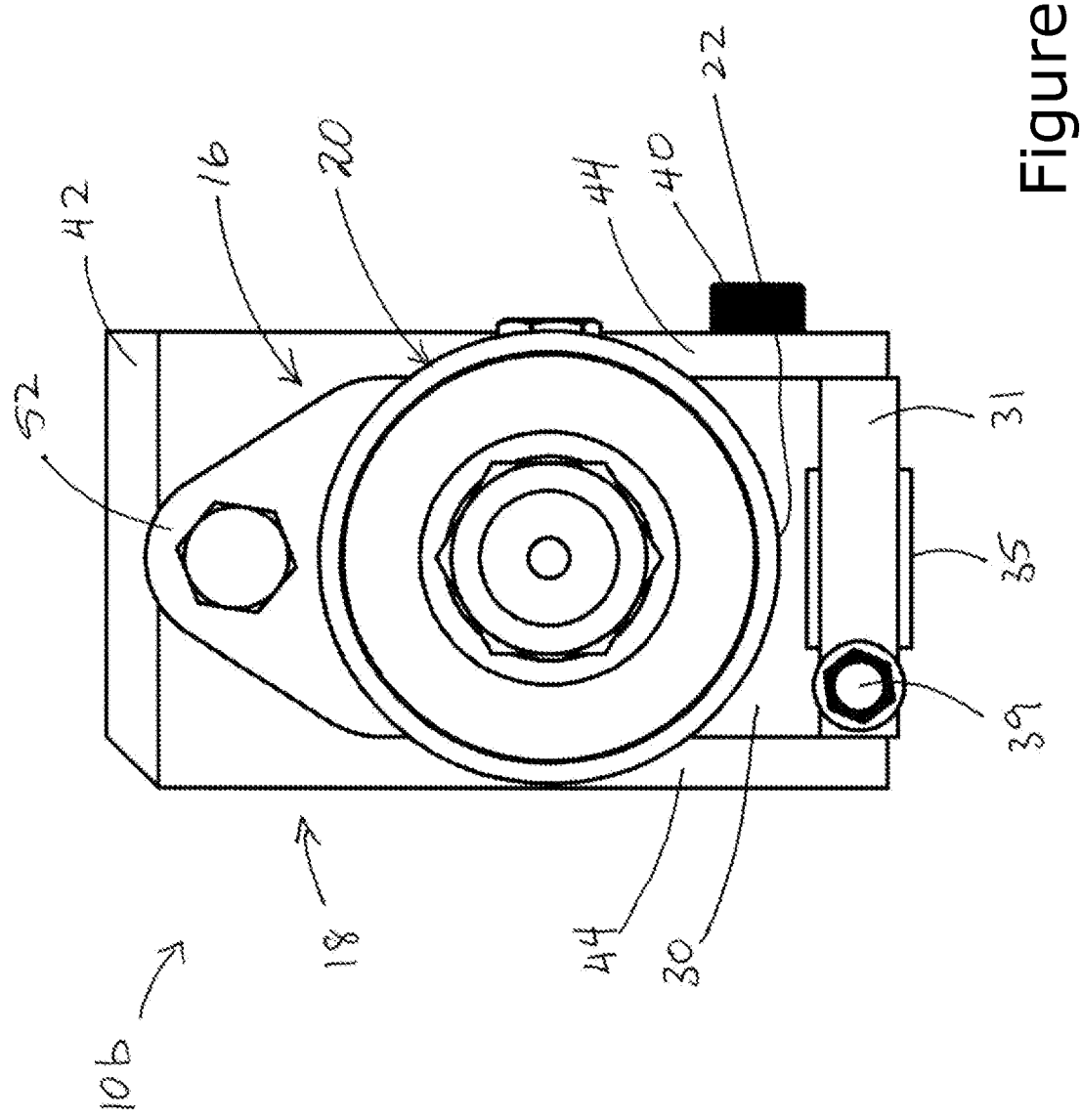
FIG. 27 is a front elevational view of the fixed blade guide of FIG. 23.
Figure 28:
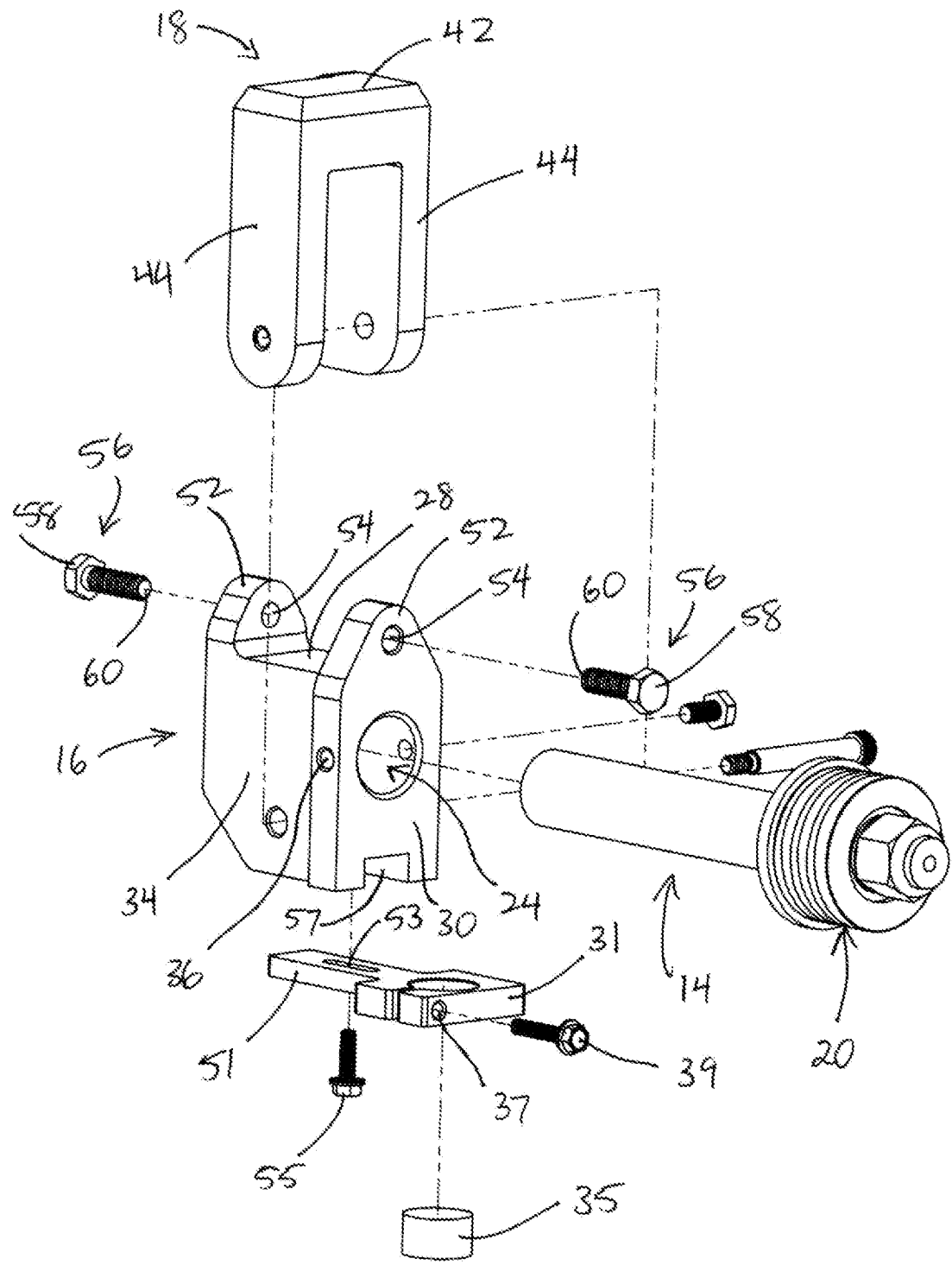
FIG. 28 is an exploded view of the fixed blade guide of FIG. 23.

FIGS. 17 and 18 illustrate another fixed blade guide assembly 200a with fixed blade guide 10a having block guide 41, rather than fixed blade guide 10. Fixed blade guide assembly 200a is otherwise similar to fixed blade guide assembly 200, as described above.

An alternate embodiment of blade guide 10 is slideable blade guide 11 for adjusting elongate blade 82, with the same longitudinal axis, of sawmill 70 is shown in FIGS. 29-35.

As depicted, slideable blade guide 11 is similar to the embodiment described above, with similar guide 12, shaft 14, shaft block 16, and angular adjustment mechanism 50. However, trunnion block 18 is different in that it further comprises a projection 62 extending from header 42 away from extensions 44, generally parallel to extensions 44. Projection 62 is also shown to be a rectangular prism. However, projection 62 may, in other applications, have different shape.

Figure 29:
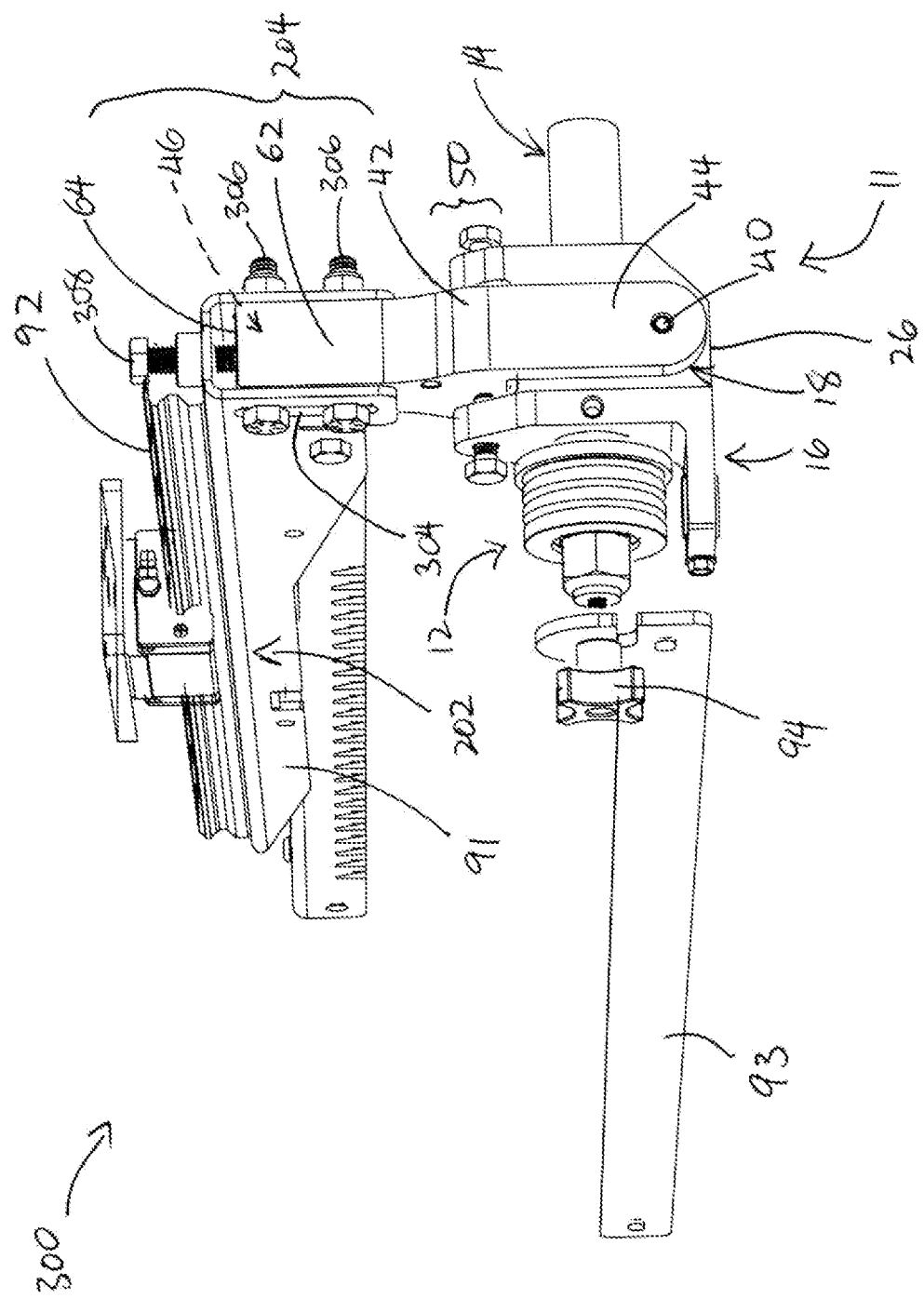
FIG. 29 is an enlarged front, right perspective view of portion B of FIG. 6, showing one embodiment of the slidable blade guide in a slidable blade guide assembly.
Figure 30:
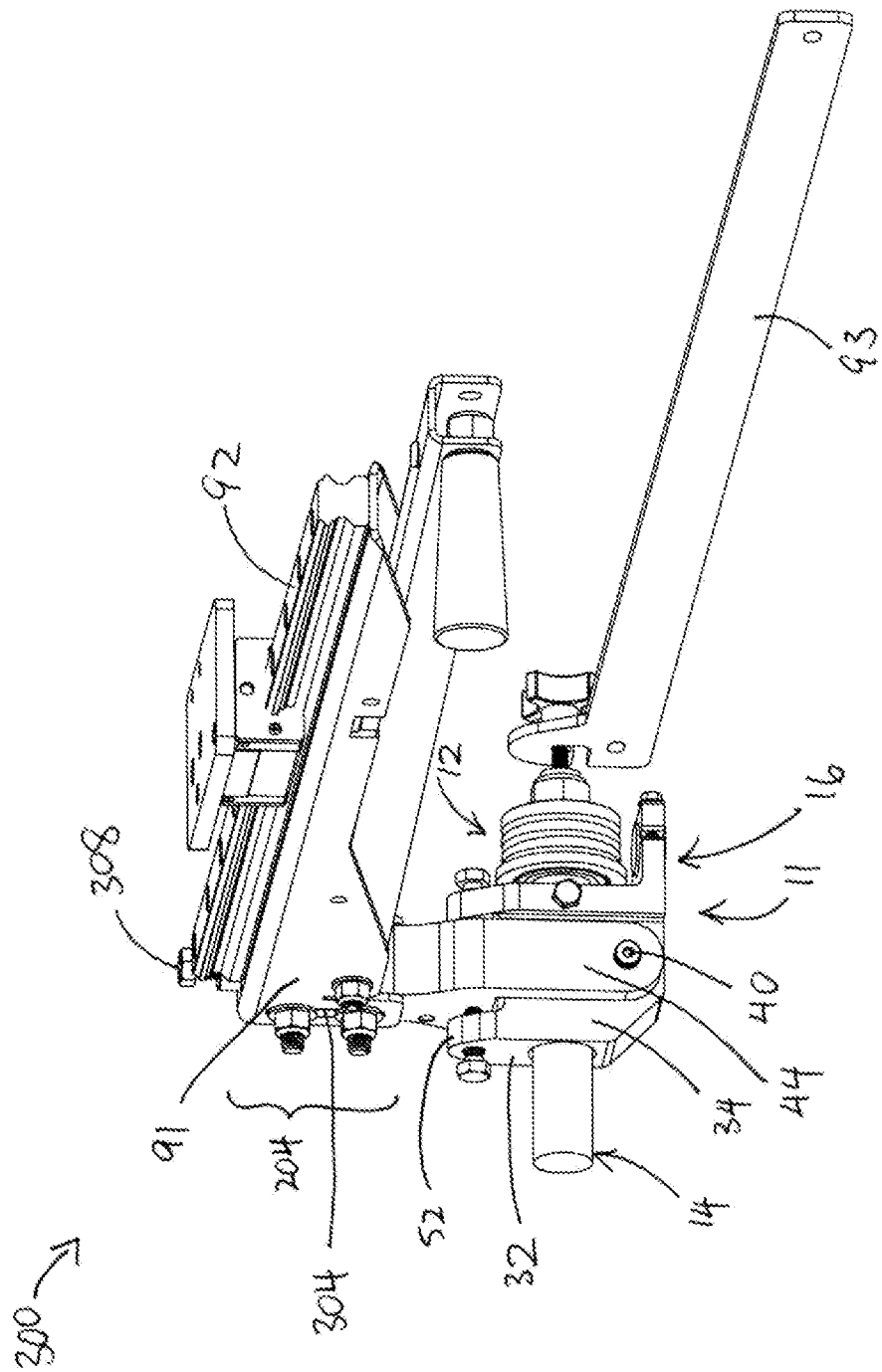
FIG. 30 is a left rear perspective view of FIG. 29.
Figure 31:
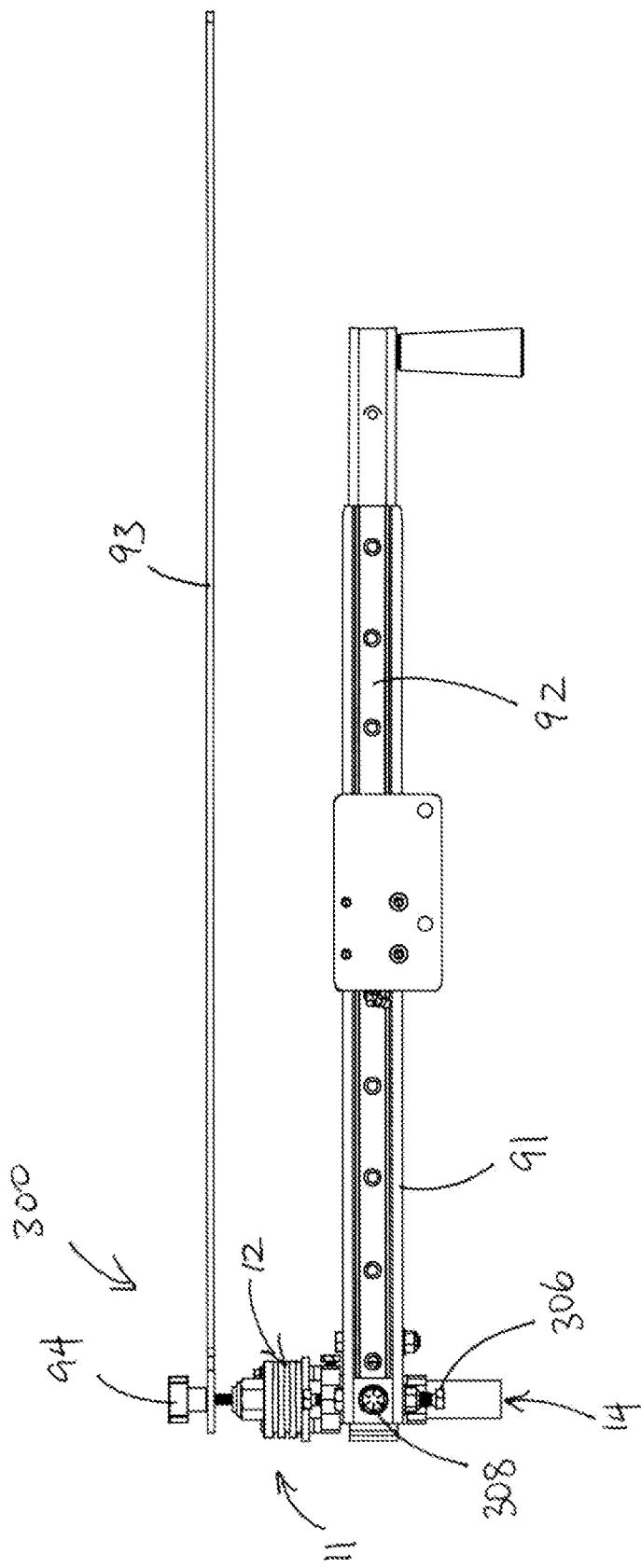
FIG. 31 is a plan view of FIG. 29.
Figure 32:
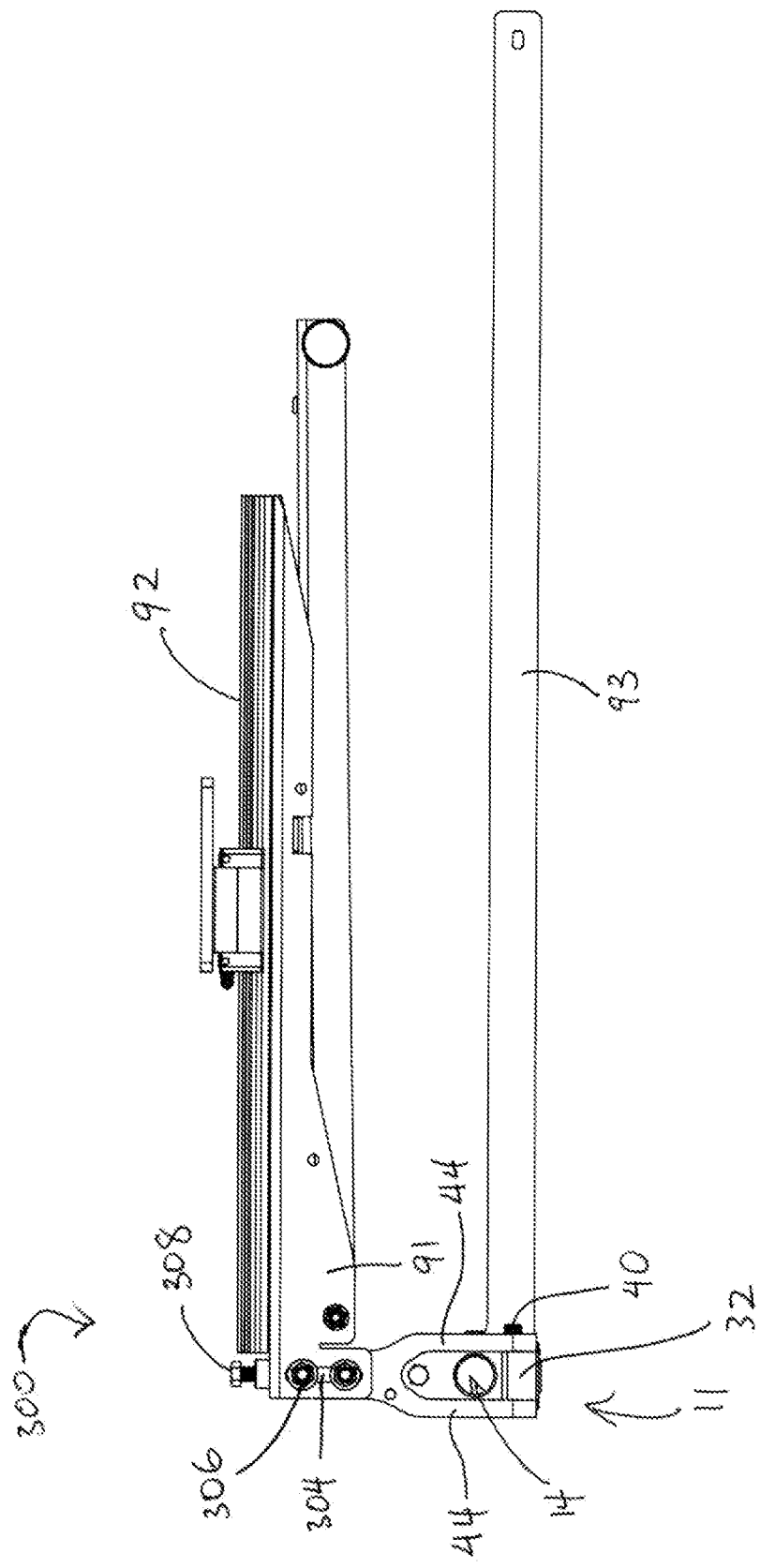
FIG. 32 is a rear elevational view of FIG. 29.
Figure 33:
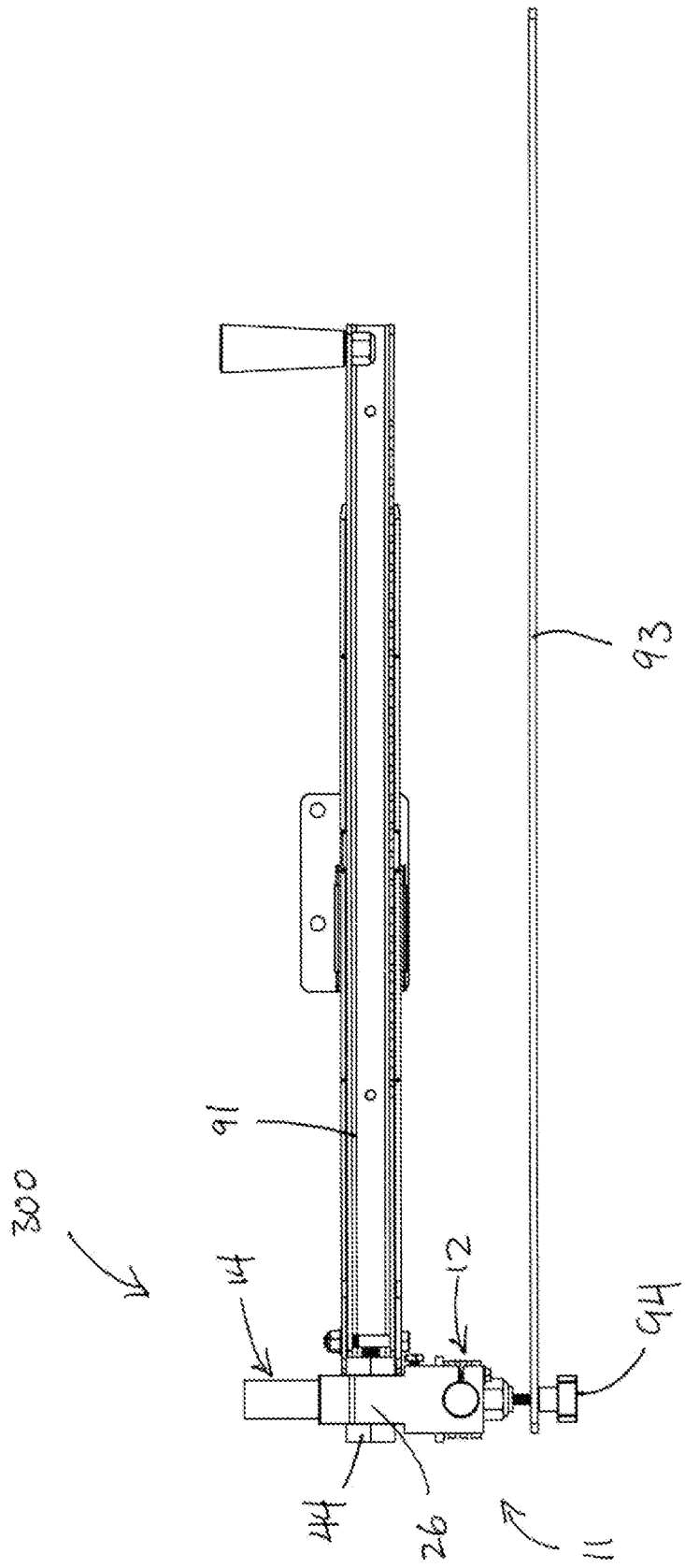
FIG. 33 is a bottom plan view of FIG. 29.
Figure 34:
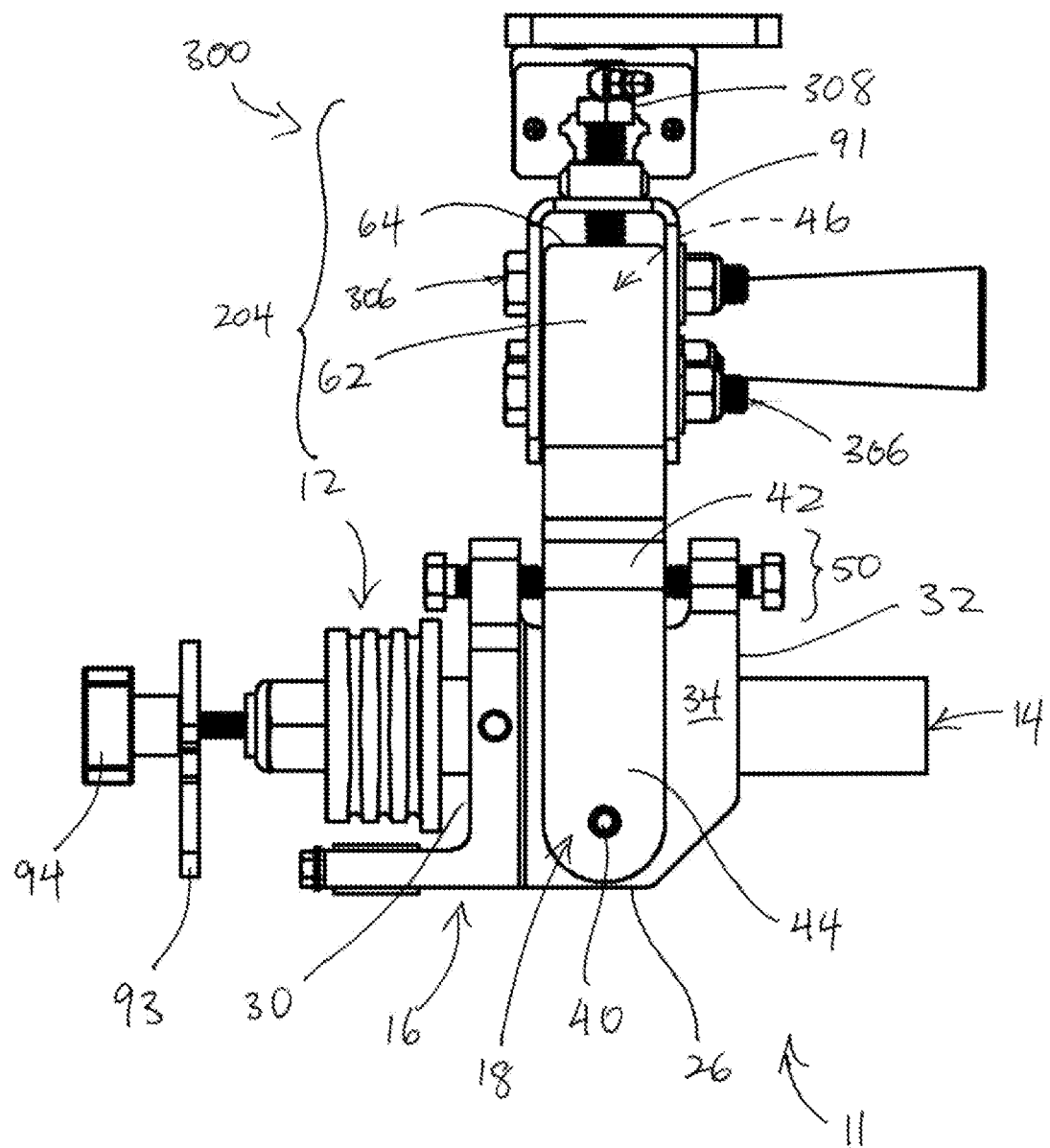
FIG. 34 is a right side elevational view of FIG. 29.
Figure 35:
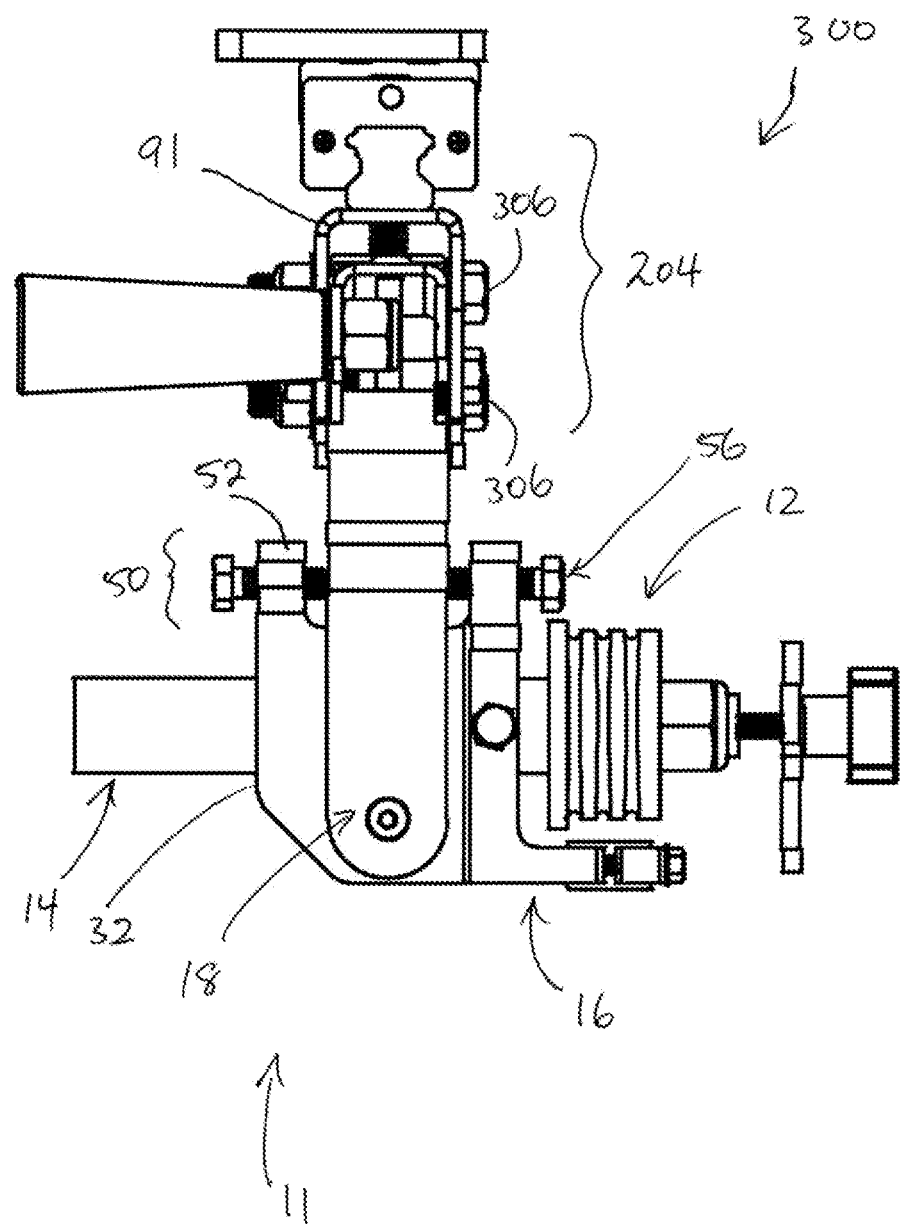
FIG. 35 is a left side elevational view of FIG. 29.
Figure 36:
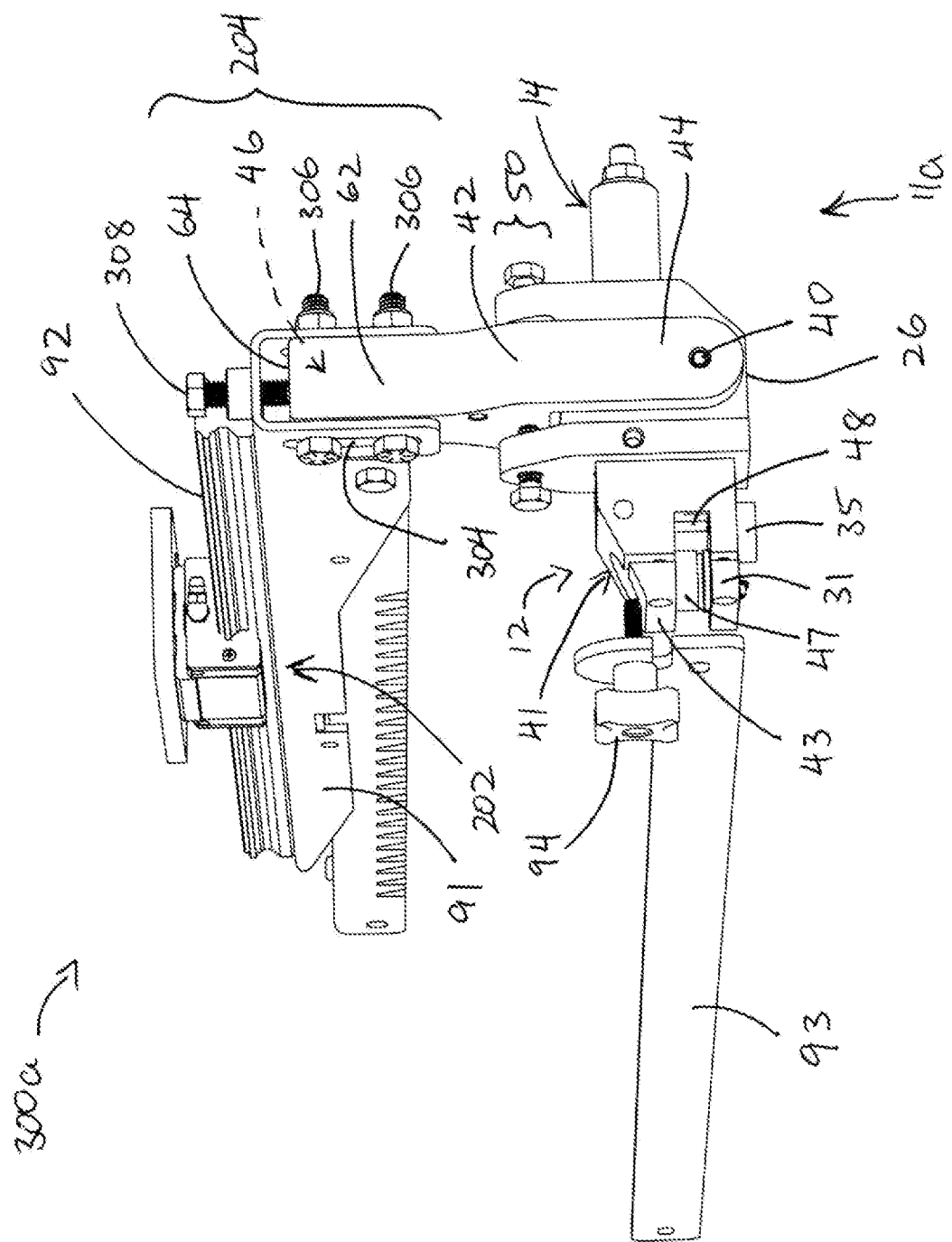
FIG. 36 is a view of FIG. 29 with another embodiment of the slidable blade guide with a block guide in another slidable blade guide assembly.
Figure 37:
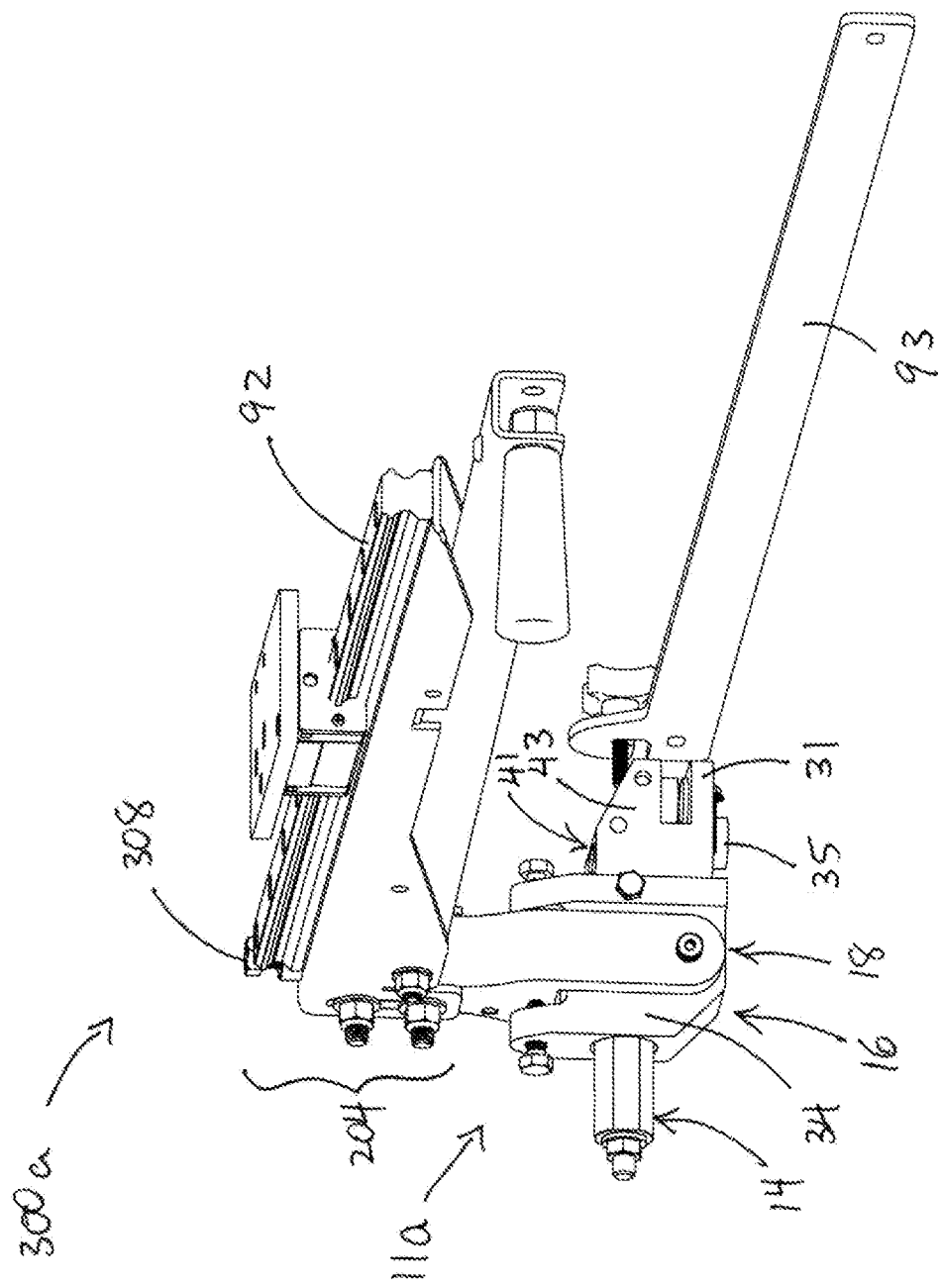
FIG. 37 is a left rear perspective view of FIG. 36.
Figure 38:
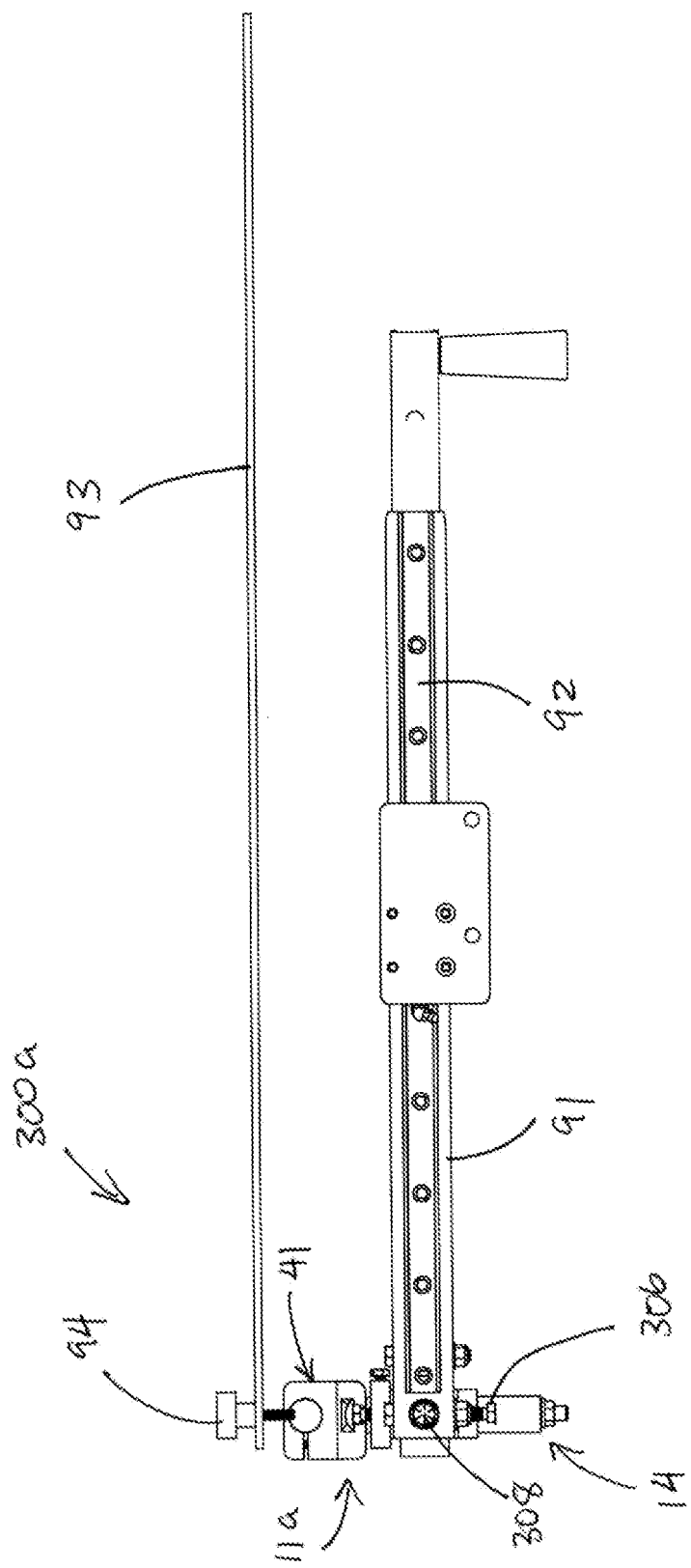
FIG. 38 is a plan view of FIG. 36.
Figure 39:
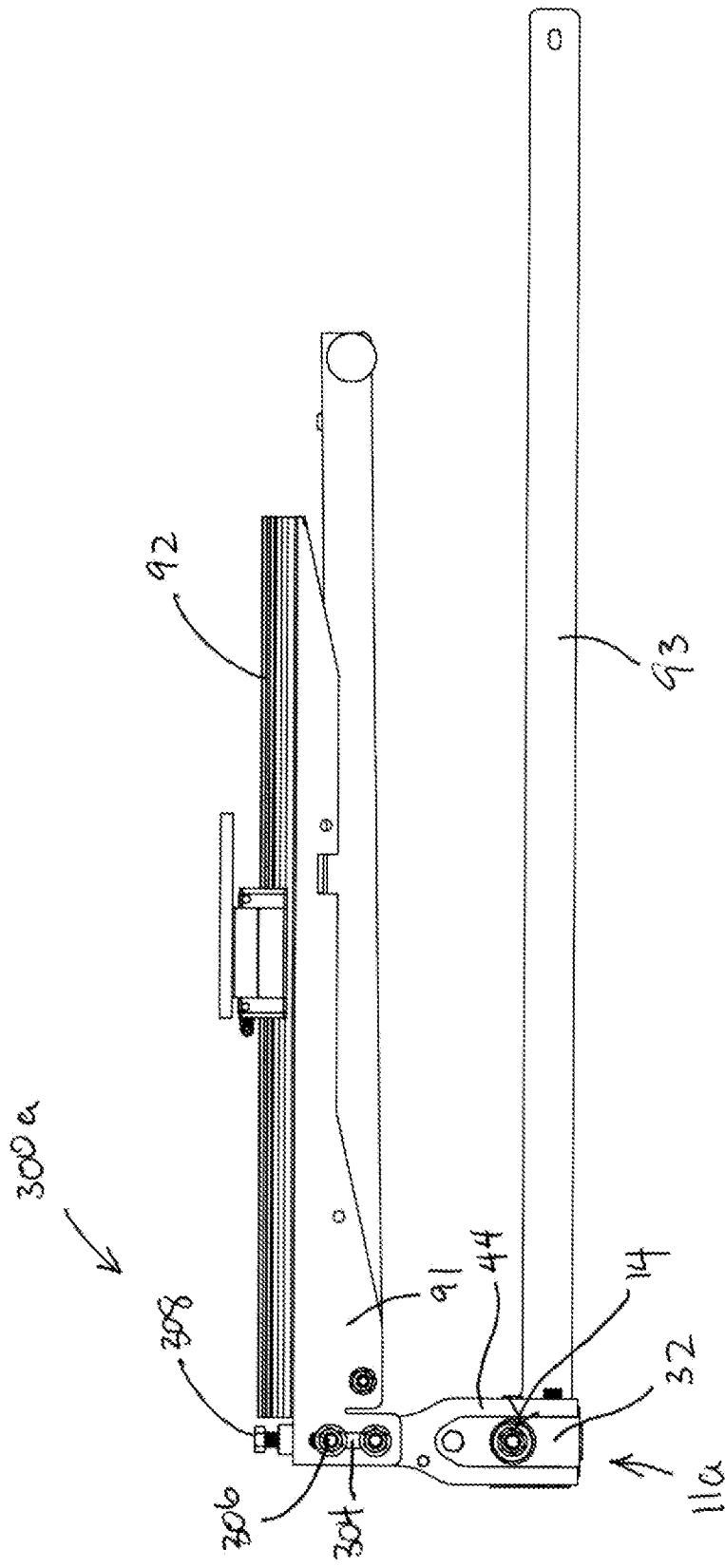
FIG. 39 is a rear elevational view of FIG. 36.
Figure 40:
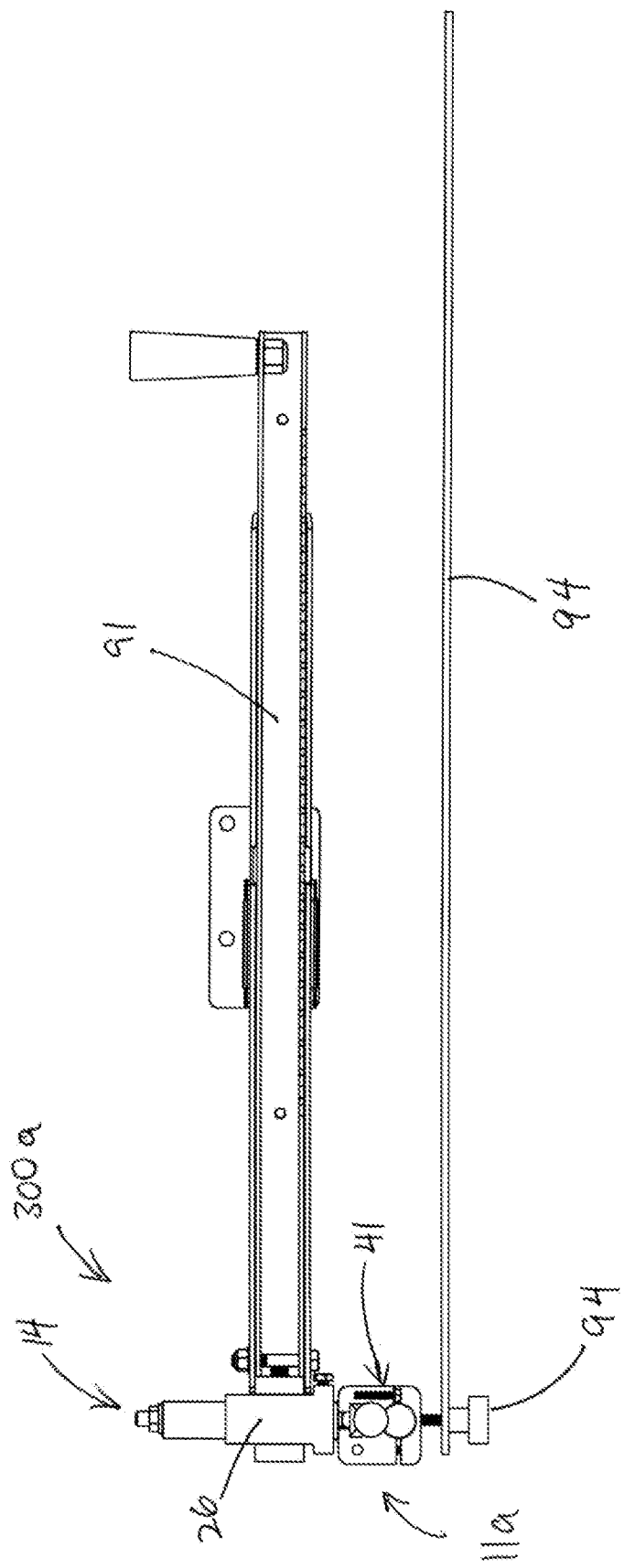
FIG. 40 is a bottom plan view of FIG. 36.
Figure 41:
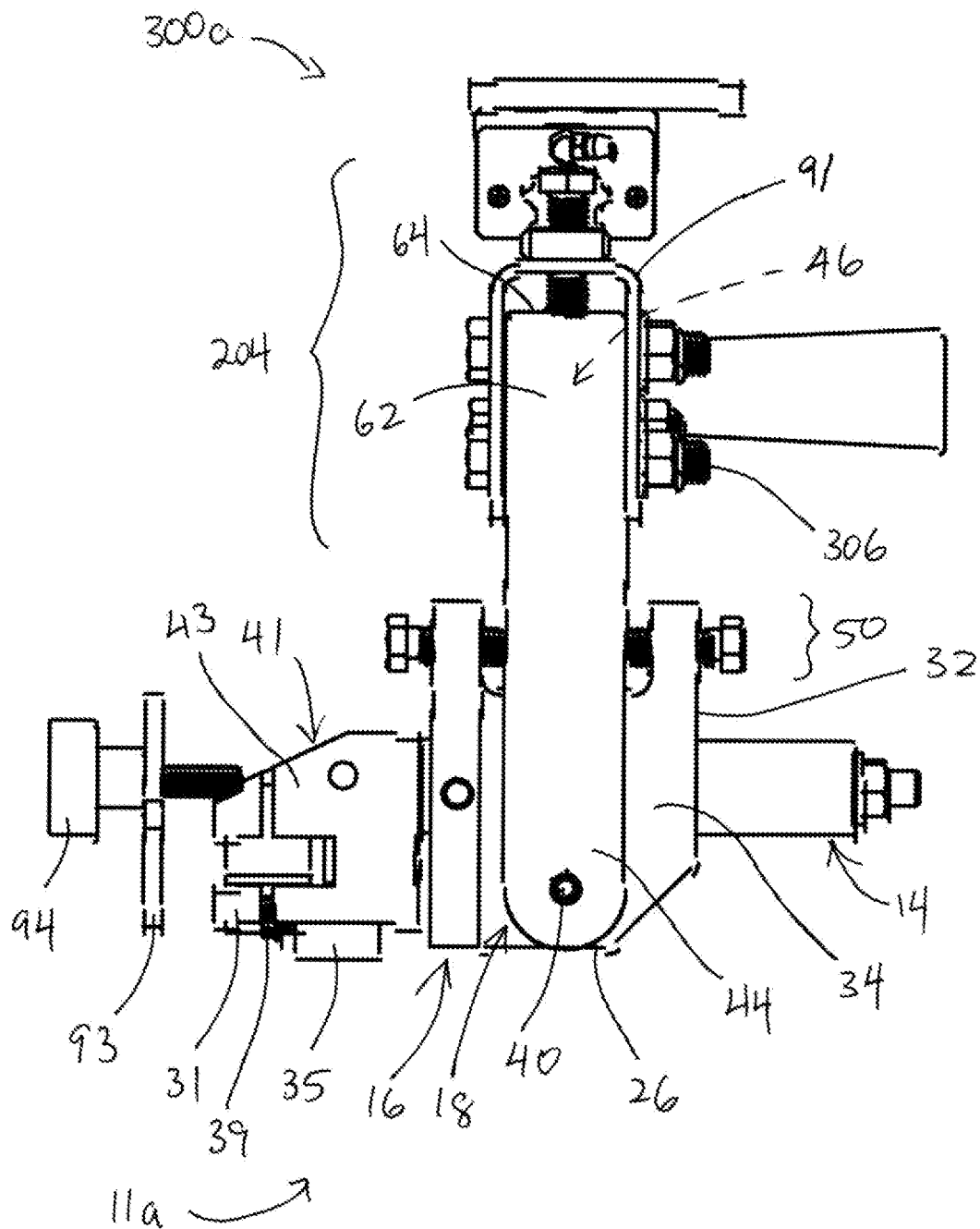
FIG. 41 is a right side elevational view of FIG. 36.
Figure 42:
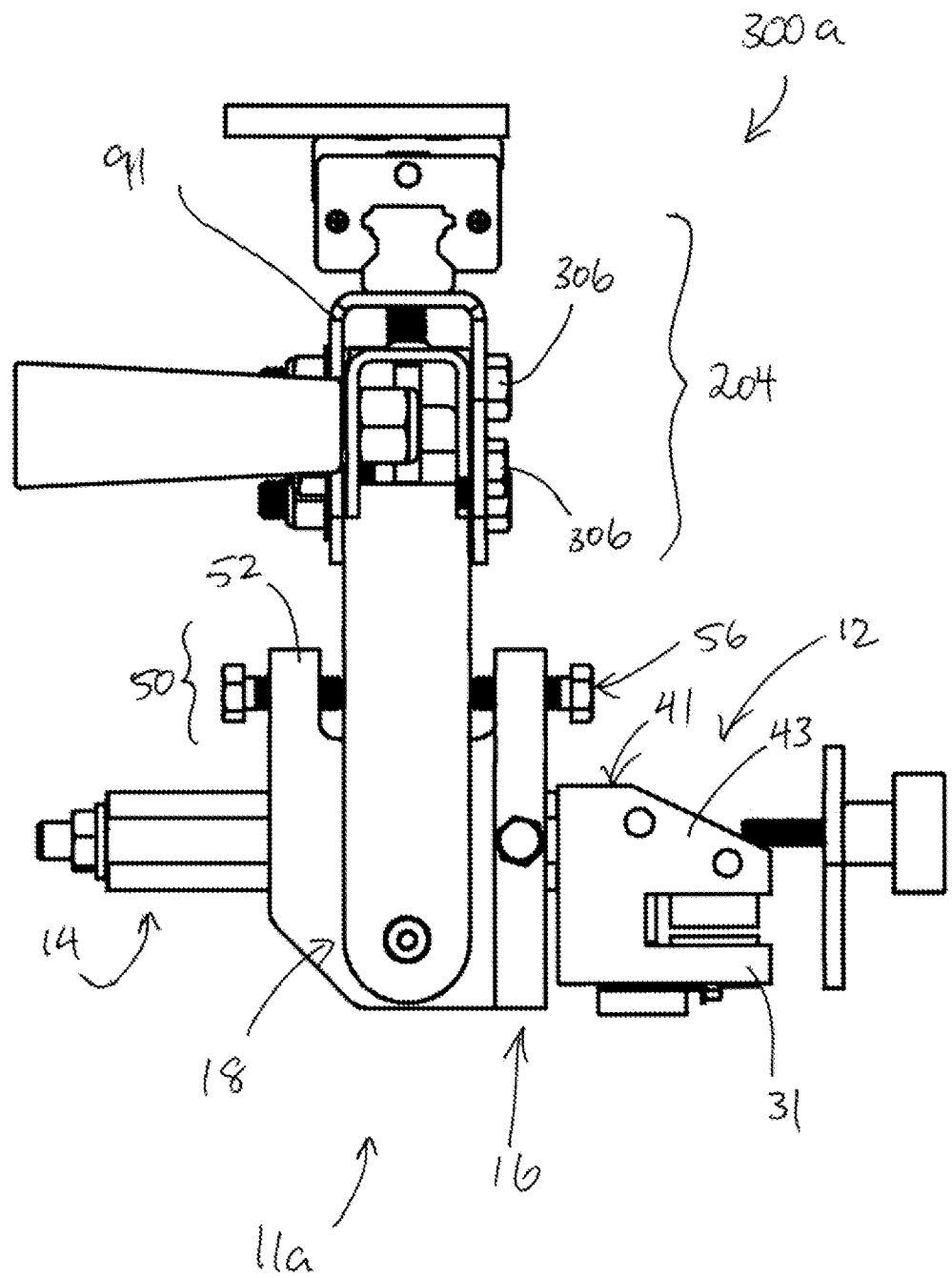
FIG. 42 is a left side elevational view of FIG. 36.

As well, rather than block openings 46 (FIG. 16) being positioned in or on one of extensions 44, block openings 46 in the alternate embodiment extend through projection 62 of trunnion block 18 (FIG. 29). The shown embodiment illustrates block openings 46 extending through projection 62 generally parallel to shaft 14. In alternate examples, block openings 46 may extend through projection 62 generally perpendicular, or another angle, to shaft 14.

The depicted projection 62 further includes an adjustment surface 64. As discussed in further detail below, adjustment surface 64 is adapted to engage with an end of a fastener to adjust the vertical position of trunnion block 18 relative to adjustable guide support 91.

An alternate embodiment of slideable blade guide 11 is slideable blade guide 11a shown in FIGS. 36-42. Slideable blade guide 11a is generally similar to slideable blade guide 11. However, rather than roller guide 20, guide 12 is block guide 41, similar to stationary blade guide 10a as described above.

FIGS. 29-35 illustrate an alternate embodiment of the blade guide assembly, or slideable blade guide assembly 300. In this alternate embodiment, slideable blade guide assembly 300 generally includes all the components of slideable blade guide 11 as described above.

Similar to fixed blade guide assembly 200, slideable blade guide assembly 300 includes sawmill member 202, to which the trunnion block 18 is secured (i.e. adjustable guide support 91), and vertical adjustment mechanism 204 which is positioned between sawmill member 202 and trunnion block 18.

However, rather than flange 208, sawmill member 202 of slideable blade guide assembly 300 is adjustable guide support 91, which is secured to saw head 71 of sawmill 70. As depicted, vertical adjustment mechanism 204 includes a pair of oblong openings 304 arranged in parallel to one another in adjustable guide support 91 and positioned on either side of projection 62.

As noted above, trunnion block 18 of slideable blade guide 11 includes projection 62 that extends from header 42 away from extensions 44 of trunnion block 18. Block openings 46 extend through projection 62 of trunnion block 18 and are aligned with oblong openings 304. Similar to fixed blade guide assembly 200, fasteners 306 are shown extending through oblong openings 304 and block openings 46 to secure trunnion block 18 to adjustable guide support 91.

In order to vertically shift trunnion block 18 relative to adjustable guide support 91, fasteners 306 may be loosened, and trunnion block 18 may be manually adjusted to the desired vertical position as allowed by oblong apertures 304. Fasteners 306 may then be tightened to secure trunnion block 18 to adjustable guide support 91.

For even finer vertical adjustments of the vertical position of trunnion block 18 relative to sawmill 70, vertical adjustment mechanism 204 of slideable blade guide assembly 300 may also include an adjustment surface 64 on at the top of projection 62. As such, adjustable guide support 91 extends over adjustment surface 64 and adjustable guide support 91 has a vertical adjustment aperture positioned at its distal end above adjustment surface 64.

Vertical adjustment mechanism 204 is thus also depicted to include a vertical adjustment bolt 308 extending though the vertical adjustment aperture of adjustable guide support 91 to operatively engage with adjustment surface 64 of projection 62.

To vertically shift trunnion block 18 relative to adjustable guide support 91, vertical adjustment bolt 308 may be rotated to push trunnion block 18 down relative to adjustable guide support 91, where oblong openings 304 allows fasteners 306 to vertically slide therein. Adjustment bolt 308 may alternately be rotated upwards to allow projection 62 to be manually shifted upwards along oblong openings 304 and tightened in place with fasteners 306.

An alternate embodiment of slideable blade guide assembly 300 is slideable blade guide assembly 300a shown in FIGS. 36-42. Slideable blade guide assembly 300a is generally similar to slideable blade guide assembly 300, except that slideable blade guide assembly 300a incorporates slideable blade guide 11a, rather than slideable blade guide 11.

It is to be understood that what has been described are the preferred embodiments of the invention. The scope of the claims should not be limited by the preferred embodiments set forth above, but should be given the broadest interpretation consistent with the description as a whole.

What is claimed is:

1. A blade guide for adjusting an elongate blade of a sawmill, the blade having a longitudinal axis, the blade guide comprising:
    a guide body with a blade surface for lateral contact with the blade;
    a shaft extending from the guide body;
    a shaft block having a bore extending therethrough, the bore dimensioned to slidably receive the shaft therethrough; and
    a trunnion block pivotably coupled to the shaft block about a pivot, the pivot orientated generally parallel to the longitudinal axis of the blade, the trunnion block adapted to be securable to the sawmill;
    wherein pivoting the shaft block and, thereby, the shaft relative to the trunnion block causes the guide body to pivot and adjust the blade about the longitudinal axis,
    wherein a longitudinal axis of the blade guide corresponds with the longitudinal axis of the blade,
    wherein the pivoting of the shaft block and, thereby, the shaft includes pivoting the shaft block, and, thereby, the shaft about the pivot relative to the trunnion block which causes the guide body to pivot and adjust the blade about the longitudinal axis of the blade,
    the blade guide further comprising an angular adjustment protrusion positioned between the shaft block and the trunnion block, the angular adjustment protrusion oriented perpendicular to, and spaced apart from the pivot, configured to modify a pivot angle between the shaft block and the trunnion block;
    wherein engaging the angular adjustment protrusion pivots the shaft block and the shaft about the pivot relative to the trunnion block, thereby causing the guide body to pivot for adjusting the blade about the longitudinal axis of the blade.

2. The blade guide of claim 1, wherein the trunnion block comprises a block opening, the block opening dimensioned to receive a sawhead fastener therethrough for securing the trunnion block to the sawmill.

3. The blade guide of claim 2, wherein the shaft block comprises a bottom face, an opposed top face, the trunnion block extending at least from the bottom face to the top face of the shaft block.

4. The blade guide of claim 3, wherein the shaft block further comprises a front face, a back face, and a pair of sides extending therebetween, the bore extending from the front face to the back face of the shaft block.

5. The blade guide of claim 4, wherein the shaft block further comprises a side aperture extending through one of the sides generally perpendicular to the bore, the aperture dimensioned to receive a side fastener therethrough for frictional engagement with the shaft within the bore.

6. The blade guide of claim 4, wherein the trunnion block comprises a header with an extension extending therefrom, the extension extending parallel to, and flanking, the sides of the shaft block, wherein the block opening is located on said extension, the angular adjustment protrusion is positioned adjacent to the header for operational engagement therewith, and the pivot is positioned in the extension.

7. The blade guide of claim 5, wherein the side fastener is adjustable for adjusting the shaft within the bore relative to the shaft block.

8. The blade guide of claim 6, wherein the extension of the trunnion block comprises a second block opening, each of the block openings dimensioned to receive a sawhead fastener therethrough for securing the trunnion block to the sawmill.

9. The blade guide of claim 6, wherein the trunnion block further comprises a projection extending away from the extension, the block opening extending through the projection of the trunnion block.

10. The blade guide of claim 9, wherein the projection further comprises an adjustment surface, the adjustment surface adapted to engage with an end of a trunnion block fastener to adjust the vertical position of the trunnion block relative to the sawmill.

11. The blade guide of claim 6, wherein the trunnion block is pivotably coupled to the shaft block via the pivot that is positioned proximate the bottom face of the shaft block.

12. The blade guide of claim 3, wherein the trunnion block is pivotably coupled to the shaft block via the pivot that is positioned proximate the top face of the shaft block.

13. The blade guide of claim 6, wherein the at least one angular adjustment protrusion comprises a pair of protrusions extending from the top face of the shaft block, and wherein the header of the trunnion block is positioned between the pair of protrusions for operative engagement therewith.

14. The blade guide of claim 13, wherein each of the protrusions comprises an engagement aperture, and the comprises a pair of adjustment bolts, with one of the pair of adjustment bolts extending through each engagement aperture, each adjustment bolt having a head and an opposed distal end for engagement with the header of the trunnion block.

15. The blade guide of claim 14, wherein one of the pair of protrusions extends from the front face of the shaft block and the other of the pair of protrusions extends from the back face of the shaft block.

16. The blade guide of claim 14, wherein the pair of bolts are threaded and the angular adjustment protrusion is engaged by rotating one or both of the bolts to pivot the shaft block and the shaft relative to the trunnion block.

17. The blade guide of claim 1, wherein the guide body further comprises a lower jaw extending generally parallel with the blade surface for lateral contact with the blade, the lower jaw configured to be releasably and slidably secured to the shaft block.

18. The blade guide of claim 17, wherein the guide body further comprises a tab extending from the lower jaw, the tab having an oblong aperture dimensioned to receive a fastener therethrough for releasable and slidable engagement with a bottom surface of the shaft block.

19. A sawmill comprising at least one saw and the blade guide of claim 1.

20. The blade guide of claim 1, further comprising a vertical adjustment bolt attachable to the sawmill for adjustably applying downward pressure on the trunnion block.

* * * * *